(12) United States Patent
Mochizuki et al.

(10) Patent No.: US 7,523,609 B2
(45) Date of Patent: Apr. 28, 2009

(54) HYDROSTATIC TRANSMISSION

(75) Inventors: Yasuhisa Mochizuki, Amagasaki (JP);
Koji Sakata, Amagasaki (JP); Kazuhiro Owada, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 192 days.

(21) Appl. No.: 11/626,783

(22) Filed: Jan. 24, 2007

(65) Prior Publication Data

US 2007/0169475 A1    Jul. 26, 2007

(30) Foreign Application Priority Data

Jan. 24, 2006    (JP)    ............... 2006-014799

(51) Int. Cl.
*F16D 39/00*    (2006.01)

(52) U.S. Cl. .......................................... 60/464; 60/488

(58) Field of Classification Search .................... 60/464, 60/487, 488
See application file for complete search history.

(56) References Cited

U.S. PATENT DOCUMENTS

| 4,494,624 A | 1/1985 | Scheuerle et al. |
| 5,048,294 A | 9/1991 | Oshina et al. |
| 6,074,083 A * | 6/2000 | Gebhard et al. ............... 60/464 |
| 6,755,018 B2 * | 6/2004 | Jonninen ...................... 60/464 |

FOREIGN PATENT DOCUMENTS

| EP | 1 610 040 A | 12/2005 |
| FR | 2 860 560 A | 4/2005 |
| JP | 2003-291674 | 10/2003 |

OTHER PUBLICATIONS

European Search Report mailed on Mar. 29, 2007, for European Application No. EP 07 10 1004.

* cited by examiner

*Primary Examiner*—Michael Leslie
(74) *Attorney, Agent, or Firm*—Sterne, Kessler, Goldstein & Fox P.L.L.C.

(57) ABSTRACT

There is provided a hydrostatic transmission (HST) in which a hydraulic pump unit operatively driven by a driving power source and a hydraulic motor unit arranged spaced apart from the hydraulic pump unit and operatively driving a driving-wheel are fluidly connected by way of operation fluid lines so as to form a closed circuit. The hydraulic motor unit is provided with motor-side operation fluid passages forming one part of the operation fluid lines. A motor-side charge fluid passage having a first end opened to an outside to form a motor-side charge port and a second end fluidly connected to at least one of the motor-side operation fluid passages is also included. A check valve is interposed in the motor-side charge fluid passage so as to allow the fluid to flow from the motor-side charge port to one motor-side operation fluid passage while preventing reverse flow.

8 Claims, 14 Drawing Sheets

HYDROSTATIC TRANSMISSION

BACKGROUND OF THE INVENTION

1. Field of the Invention

The present invention relates to an HST (hydrostatic transmission) including a hydraulic pump unit and a hydraulic motor unit, which are arranged spaced apart from each other.

2. Background Art

The HST includes a hydraulic pump unit operatively driven by a driving power source, a hydraulic motor unit for operatively driving a driving-wheel, operation fluid lines for fluidly connecting the hydraulic pump unit and the hydraulic motor unit so as to form a closed circuit, and a charge line for replenishing the operation fluid to the closed circuit.

An HST of a type in which the hydraulic pump unit and the hydraulic motor unit are arranged spaced apart from each other has been proposed (see e.g., Japanese Laid-Open Patent Publication No. 2003-291674).

This type of HST is effective in that the degree of freedom in designing the working vehicle to which the HST is applied can be enhanced since the hydraulic pump unit and the hydraulic motor unit are respectively arranged at the desired positions.

However, this type of conventional HST has drawbacks in that a free-wheel phenomenon is likely to occur at the driving-wheels, and in that it is difficult for the engine brake operation to effectively apply to the driving-wheels.

The drawbacks of the conventional HST will be described taking a case in which a pair of conduits for fluidly connecting the hydraulic pump unit and the hydraulic motor unit is used as part of the operation fluid lines by way of example.

The flow path resistance of the pair of conduits increases in the HST described above since the hydraulic pump unit and the hydraulic motor unit are arranged spaced apart from each other.

Therefore, when a motor main body of the hydraulic motor unit unintentionally performs a pump action in a time when the working vehicle travels downhill, the suction amount of the operation fluid by the motor main body tends to become shorter than the discharge amount of the operation fluid by a pump main body of the hydraulic pump unit due to the flow path resistance, whereby a negative pressure is created in one of the pair of conduits.

In this case, the fluid is replenished through the charge line to one of the conduits where negative pressure occurs, but the replenishing fluid supplied through the charge line is also subjected to flow path resistance since the charge line is arranged in the hydraulic pump unit in the conventional HST. Accordingly, the negative pressure that occurs in one of the conduits cannot be effectively resolved by replenishing the operation fluid through the charge line.

When negative pressure occurs in one of the conduits, a phenomenon in which the motor main body sucks the air occurs and the amount of air present in the pair of conduits increases, which leads to the free-wheel phenomenon of the driving-wheels and inhibits the engine brake operation.

BRIEF SUMMARY OF THE INVENTION

The present invention, in view of the above, aims to provide an HST in which a hydraulic pump unit operatively driven by a driving power source and a hydraulic motor unit arranged spaced apart from the hydraulic pump unit and operatively driving a driving-wheel are fluidly connected by way of operation fluid lines so as to form a closed circuit, the HST capable of effectively preventing the free-wheel phenomenon of the driving-wheel from occurring.

In order to achieve the aim, the present invention provides an HST in which a hydraulic pump unit operatively driven by a driving power source and a hydraulic motor unit arranged spaced apart from the hydraulic pump unit and operatively driving a driving-wheel are fluidly connected by way of operation fluid lines so as to form a closed circuit; wherein the hydraulic motor unit is provided with motor-side operation fluid passages forming one part of the operation fluid lines; a motor-side charge fluid passage having a first end opened to an outside to form a motor-side charge port and a second end fluidly connected to at least one of the motor-side operation fluid passages; and a check valve interposed in the motor-side charge fluid passage so as to allow the fluid to flow from the motor-side charge port to the one motor-side operation fluid passage while preventing the reverse flow.

According to the HST with the configuration, it could be effectively prevented that the suction amount of the operation fluid by a motor main body of the hydraulic motor unit becomes shorter than the discharge amount of the operation fluid by a pump main body of the hydraulic pump unit. Consequently, even if the motor main body that is operatively connected to the driving-wheel unintentionally performs a pump action, for example, in a time of traveling downhill, the free-wheel phenomenon of the driving-wheel could be effectively prevented from occurring, thereby effectively applying the engine brake to the driving-wheel.

Preferably, the motor-side charge passage is fluidly connected to a motor-side first operation fluid passage, out of the motor-side operation fluid passages, which has a negative pressure when the driving-wheel rotates in the forward direction.

With the configuration, in a time when the working vehicle travels in the forward direction, it is possible to effectively obtain the engine brake.

More preferably, the motor-side charge fluid passage includes a motor-side common charge fluid passage having a first end opened to an outside to form the motor-side charge port; a motor-side first charge fluid passage for fluidly connecting the motor-side common charge fluid passage to the motor-side first operation fluid passage; and a motor-side second charge fluid passage for fluidly connecting the motor-side common charge fluid passage to a motor-side second operation fluid passage, out of the pair of motor-side operation fluid passages, which has a negative pressure in a time when the driving-wheel rotates in the rearward direction. In the configuration, the check valve is inserted into each of the motor-side first and second operation fluid passages.

In the above various configurations, preferably, the hydraulic pump unit is provided with pump-side operation fluid passages forming one part of the pair of operation fluid lines; a pump-side charge fluid passage having a first end opened to an outside to form a pump-side charge port and a second end fluidly connected to at least one of the pump-side operation fluid passages; and a check valve interposed in the pump-side charge fluid passage so as to allow the fluid to flow from the pump-side charge port to the one pump-side operation fluid passage while preventing the reverse flow. In the configuration, the flow path resistance of a motor-side charge line for replenishing the operation fluid from a fluid source to the one motor-side operation fluid passage through the motor-side charge fluid port is set to be smaller than that of a pump-side charge line for replenishing the operation fluid from the fluid source to the one pump-side operation fluid passage through the pump-side charge fluid port.

With the configuration, it is possible to replenish the operation fluid in the vicinity of the pump main body of the hydraulic pump unit while effectively preventing the free-wheel phenomenon from occurring so as to effectively obtain the engine brake.

Preferably, a biasing member of the check valve provided in the hydraulic motor unit has a biasing force less than the biasing member of the check valve provided in the hydraulic pump unit.

In place of or in addition to the configuration, a conduit for fluidly connecting the fluid source and the motor-side charge fluid port may have a length shorter than a conduit for fluidly connecting the fluid source and the pump-side charge fluid port.

In place of or in addition to the configuration, a throttle may be inserted in the pump-side charge line.

In the above various configurations, the fluid source is, for example, a charge pump main body mounted at the hydraulic pump unit.

In the above various configurations, the hydraulic motor unit may include a motor shaft operatively connected to the driving-wheel; a motor main body that is fluidly connected to a pump main body of the hydraulic pump unit through the operation fluid lines and drives the motor shaft around its axis line; and a motor case that is capable of storing fluid and accommodates the motor main body, the motor case being provided with the motor-side operation fluid passages and the motor-side charge fluid passage; and the motor case may be further provided with a self-suction passage having a first end opened into an inner space of the motor case and a second end fluidly connected to the motor-side charge fluid passage, and a check valve for allowing the fluid to flow from the first end to the second end of the self-suction fluid passage while preventing the reverse flow.

The present invention further provides an HST in which a hydraulic pump unit operatively driven by a driving power source and a hydraulic motor unit arranged spaced apart from the hydraulic pump unit and operatively driving a driving-wheel are fluidly connected by way of operation fluid lines so as to form a closed circuit; wherein the hydraulic motor unit includes a motor shaft operatively connected to the driving-wheel; a motor main body that is fluidly connected to a pump main body of the hydraulic pump unit through the operation fluid lines and drives the motor shaft around its axis line; and a motor case that is capable of storing fluid and accommodates the motor main body; and the motor case is provided with motor-side operation fluid passages forming one part of the operation fluid lines; a self-suction passage having a first end opened into an inner space of the motor case and a second end fluidly connected to the motor-side charge fluid passage, and a check valve for allowing the fluid to flow from the first end to the second end of the self-suction fluid passage while preventing the reverse flow.

With the configuration, the free-wheel phenomenon could be effectively prevented even when the power source is stopped.

BRIEF DESCRIPTION OF THE DRAWINGS/FIGURES

The invention, together with objects and advantages thereof, may best be understood by reference to the following description of the presently preferred embodiments together with the accompanying drawings.

DETAILED DESCRIPTION OF THE INVENTION

Embodiment 1

The preferred embodiments of the HST according to the present invention will now be described with reference to the accompanying drawings.

Figure 1:
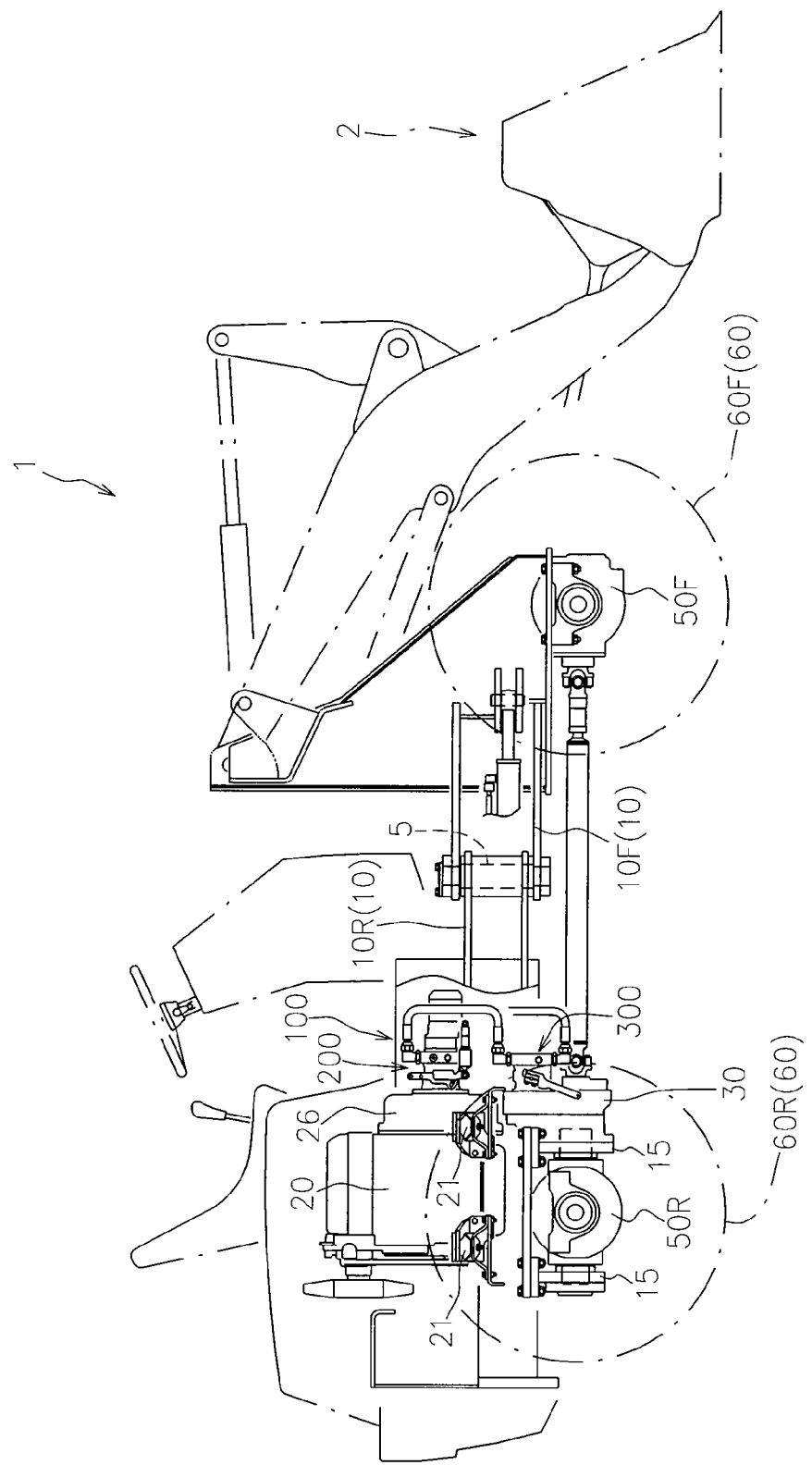
FIG. 1 is a schematic side view of a working vehicle to which an HST according to an embodiment 1 of the present invention is applied.
Figure 2:
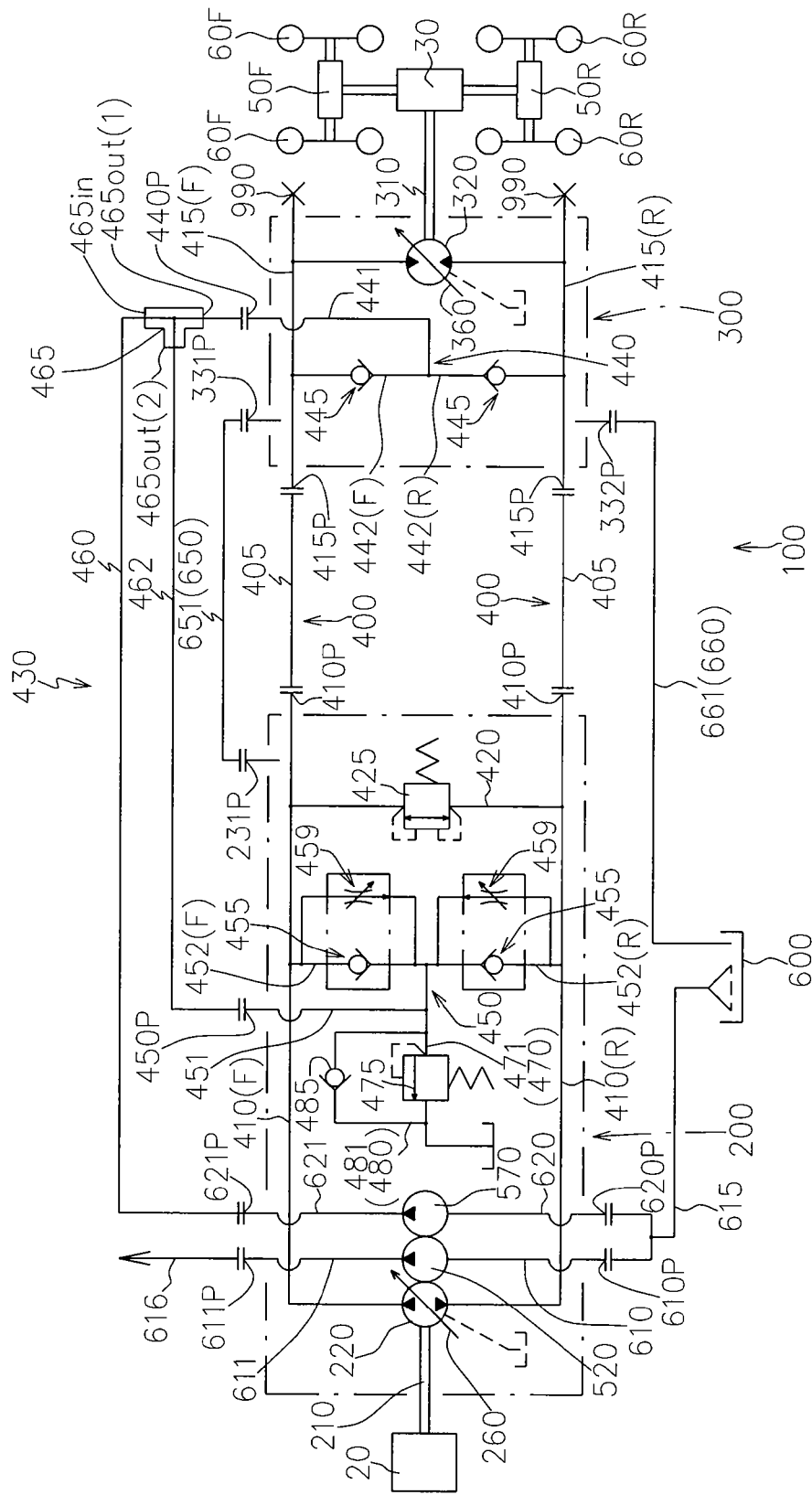
FIG. 2 is a hydraulic circuit diagram of the HST according to the embodiment 1.

FIG. 1 shows a schematic side view of a working vehicle 1 to which an HST 100 according to the present embodiment is applied. FIG. 2 shows a hydraulic circuit diagram of the HST 100.

The working vehicle 1 is a riding working vehicle including a bucket 2 in the present embodiment, as shown in FIG. 1.

Specifically, the working vehicle 1 includes a vehicle frame 10 with a front frame 10F and a back frame 10R that are coupled to each other in a swingable manner about a pivot shaft 5 along a substantially vertical direction; the bucket 2 arranged at the front of the front frame 10F so as to be capable of raising and lowering; a driving power source 20 supported by the rear frame 10R; the HST 100 operatively connected to the driving power source 20; a power dividing device 30 for branching the output of the HST 100 and outputting the same to the forward and rearward directions; a front differential device (not shown) receiving the forward output from the power dividing device 30; a front axle case 50F supported by the front frame 10F while accommodating the front differential device; a pair of front wheels 60F operatively driven each by a pair of left and right front differential output shafts in the front differential device; a rear differential device 40R (see FIG. 8 mentioned below) receiving the rearward output from the power dividing device 30; a rear axle case 50R supported by the rear frame 10R while accommodating the rear differential device 40R; and a pair of rear wheels 60R operatively driven each by a pair of left and right rear differential output shafts in the rear differential device 40R.

The HST 100 according to the present embodiment configures a traveling system variable speed transmission mechanism in the working vehicle 1.

Specifically, the HST includes a hydraulic pump unit 200 and a hydraulic motor unit 300 fluidly connected by way of a pair of operation fluid lines 400 so as to form a closed circuit, as shown in FIG. 2.

At least one of the hydraulic pump unit 200 and the hydraulic motor unit 300 is of a variable displacement type, and both units are configured to be capable of being independently mounted so as to be arranged spaced apart from each other.

Both the hydraulic pump unit 200 and the hydraulic motor unit 300 are variable displacement type in the present embodiment, as shown in FIG. 2.

Figure 3:
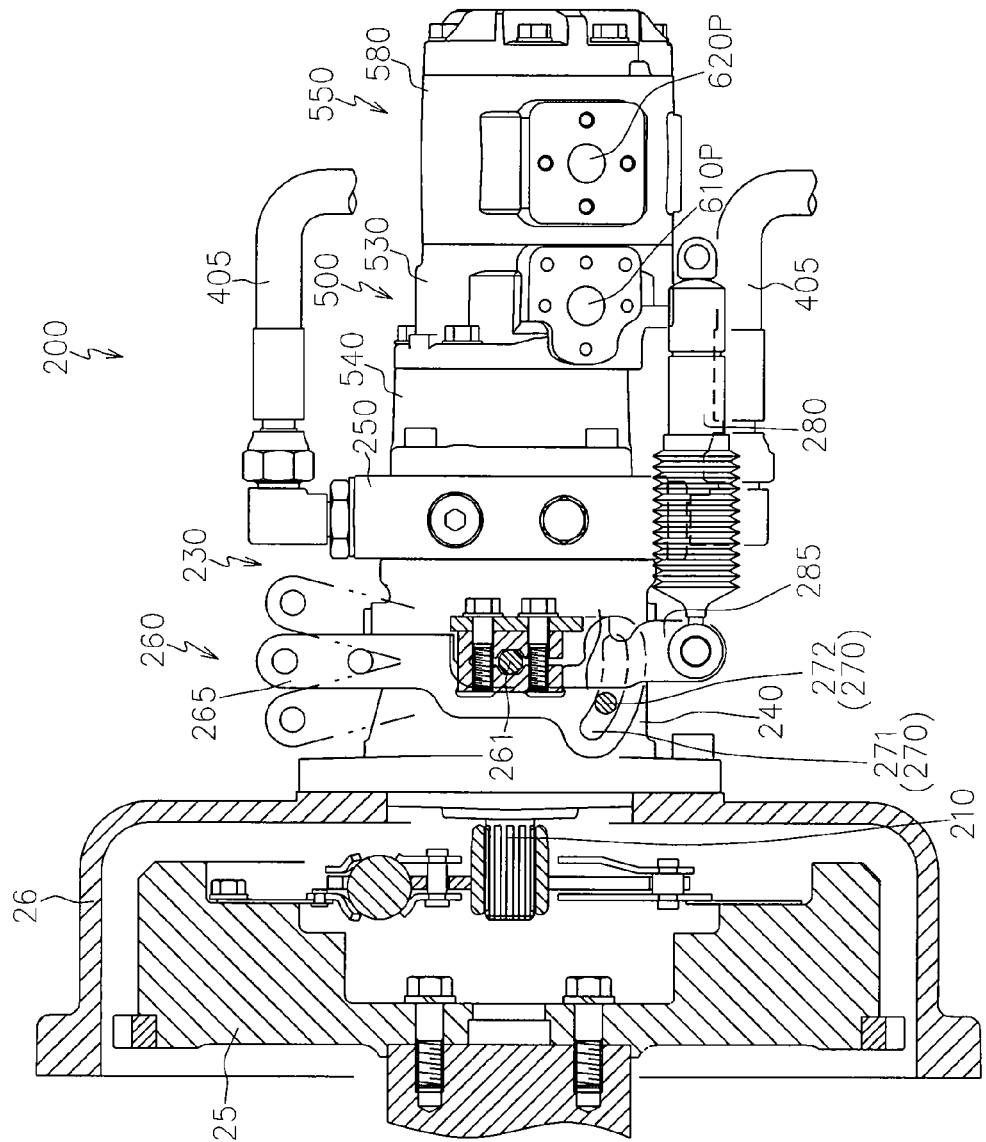
FIG. 3 is a partial longitudinal side view of the vicinity of a hydraulic pump unit of the HST according to the embodiment 1.

FIG. 3 shows a partial longitudinal side view of the vicinity of the hydraulic pump unit 200.

Figure 4:
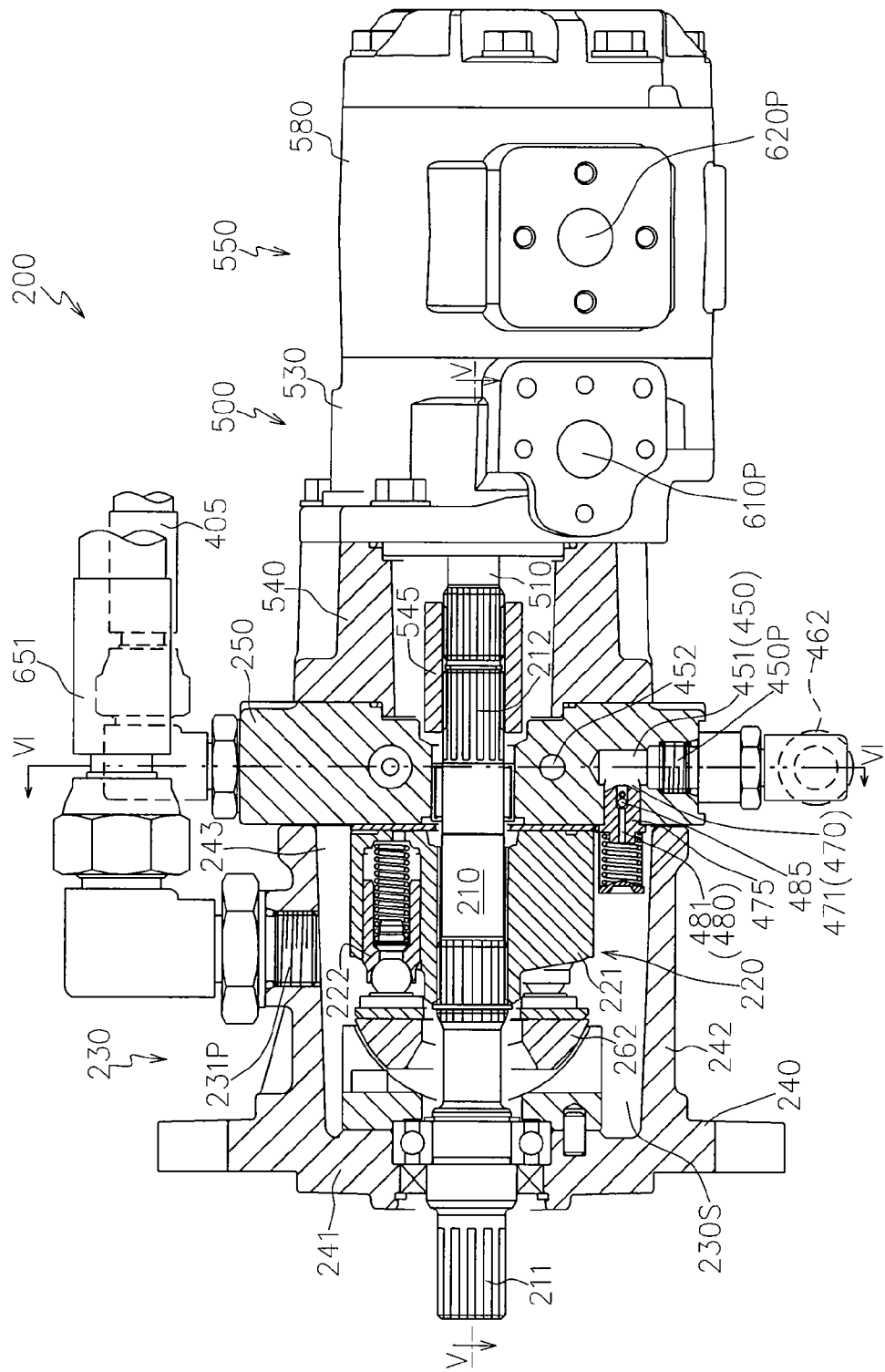
FIG. 4 is a longitudinal side view of the hydraulic pump unit shown in FIG. 3.

FIG. 4 shows a longitudinal side view of the hydraulic pump unit 200.

The hydraulic pump unit 200 is configured so as to be operatively driven by the driving power source 20.

Specifically, the hydraulic pump unit 200 includes a pump shaft 210 operatively connected to the driving power source 20 by way of a flywheel 25, a pump main body 220 supported in a relatively non-rotatable manner at the pump shaft 210, and a pump case 230 for supporting the pump shaft 210 in a freely rotating manner about the axis line while accommodating the pump main body 220, as shown in FIGS. 3 and 4.

The pump case 230 is directly or indirectly supported by a supporting member, such as the vehicle frame 10 and the like, independently.

In the present embodiment, the pump case 230 is supported by the driving power source 20 by way of a flywheel housing 26 in a free state with respect to the vehicle frame 10 (see FIGS. 1 and 3).

In other words, the driving power source 20 is supported by the rear frame 10R by way of vibration absorption rubbers 21 so as to be able to vibrate, and the pump case 230 is supported by the driving power source 20 by way of the flywheel housing 26 in a free state with respect to the rear frame 10R so as to vibrate integrally with the driving power source 20, as shown in FIG. 1.

The pump case 230A is formed with a pair of pump-side operation fluid passages 410 forming one part of the pair of operation fluid lines 400 (see FIG. 2).

Specifically, the pump case 230 includes a pump case main body 240; and a pump-side port block 250 removably coupled to the pump case main body 240, the pump-side port block 250 being formed with the pair of pump-side operation fluid passages 410, as shown in FIG. 4.

Figure 5:
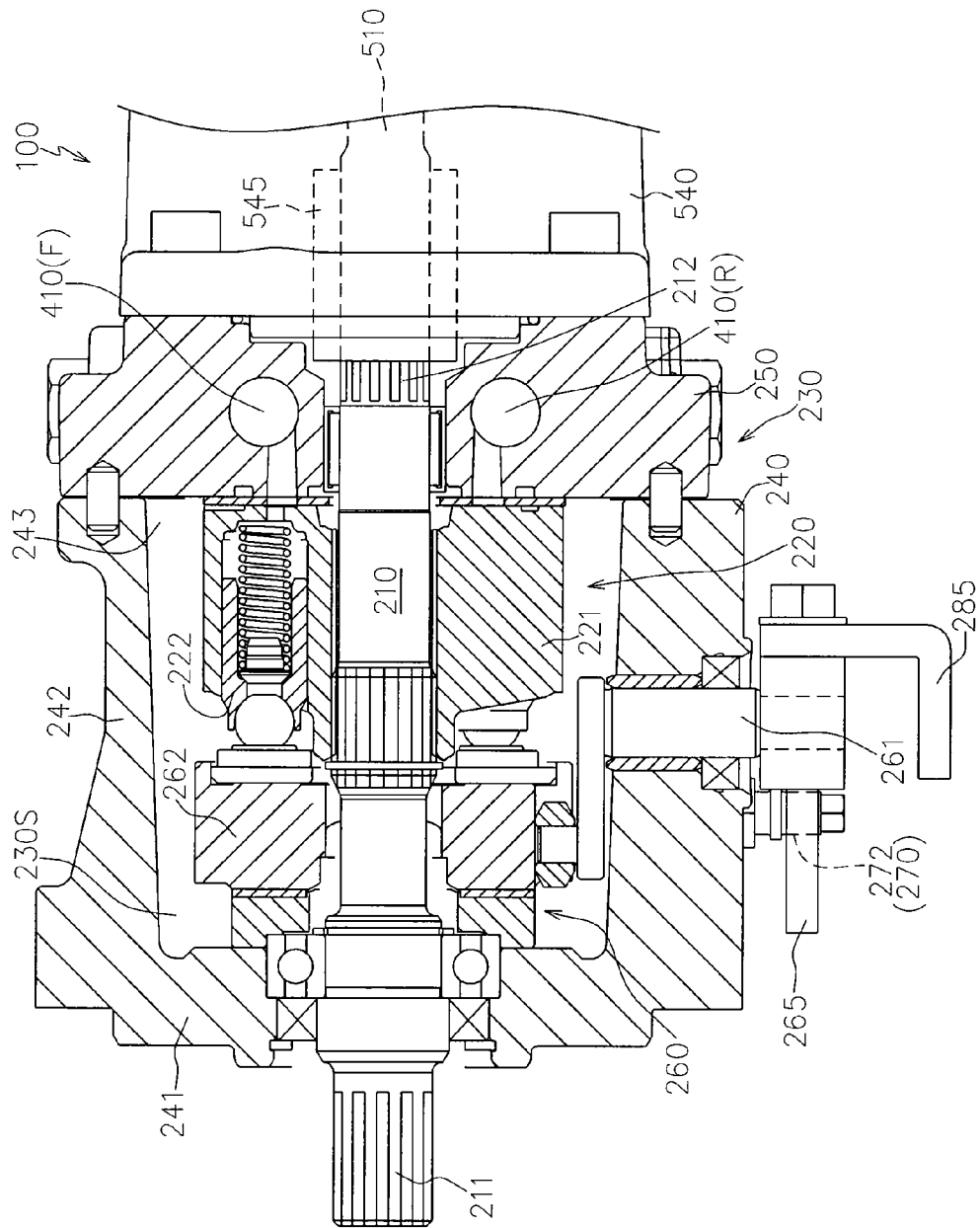
FIG. 5 is a cross sectional view taken along line V-V in FIG. 4.

FIG. 5 shows a cross sectional view taken along line V-V in FIG. 4.

As shown in FIGS. 4 and 5, the pump case main body 240 includes an end wall 241 extending in a direction orthogonal to the axis line direction of the pump shaft 210, and a peripheral wall 242 extending in the axis line direction of the pump shaft 210 from the peripheral edge of the end wall 241 so as to surround the pump main body 220, and an opening 243, through which the pump main body 220 can be inserted, formed at a free end side opposite the end wall 241 of the peripheral wall 242.

In the present embodiment, the pump case main body 240 is removably coupled to the flywheel housing 26 by way of the end wall 241.

The pump-side port block 250 is removably coupled to the pump case main body 240 so as to close the opening 243.

That is, the pump case 230 is configured to form a pump space 230S for accommodating the pump main body 220 with the end wall 241 and the peripheral wall 242 of the pump case main body 240 and the pump-side port block 250 in the present embodiment.

The pumps space 230S is preferably fluid storable.

Figure 6:
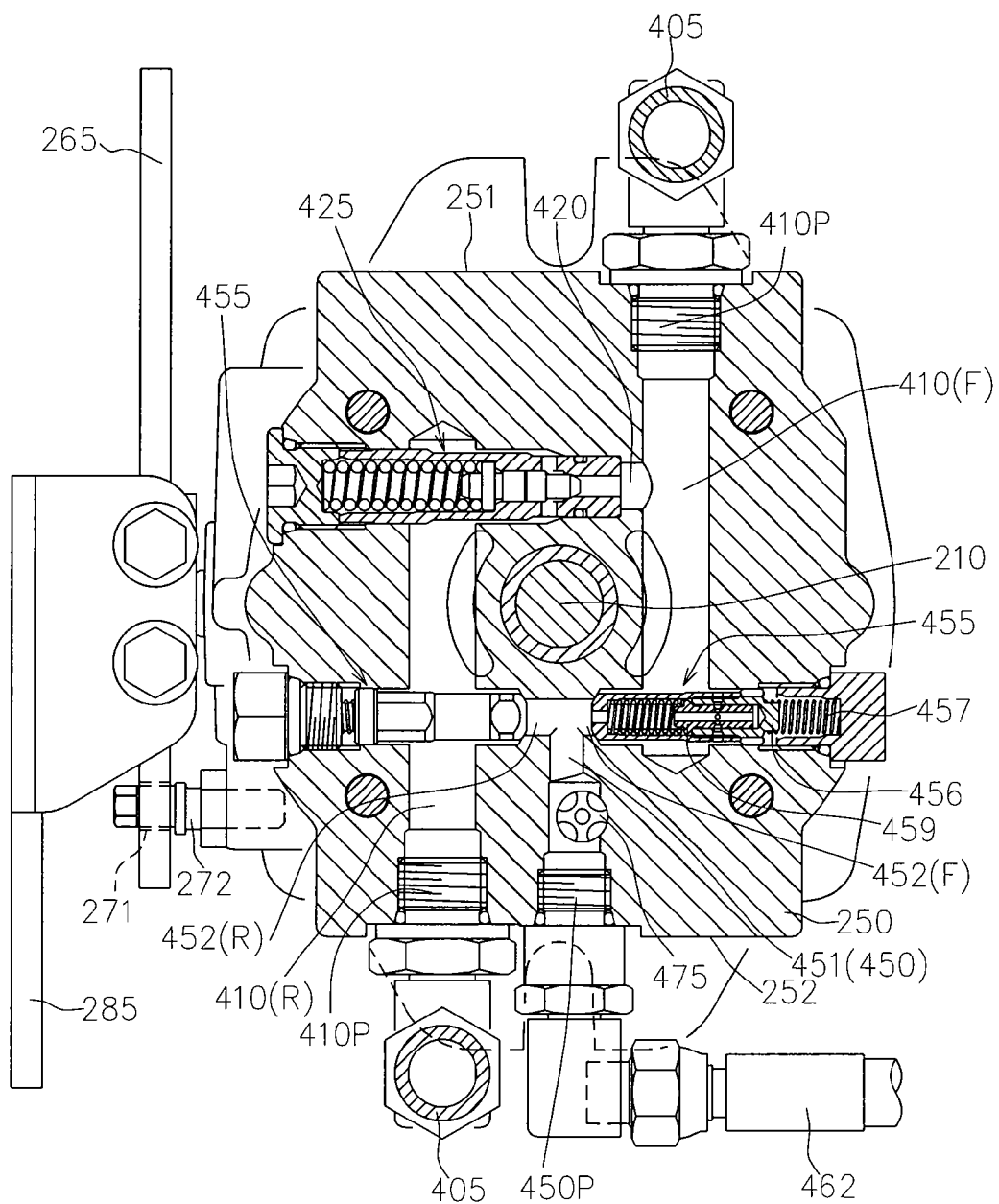
FIG. 6 is a cross sectional view taken along line VI-VI in FIG. 4.

FIG. 6 shows a cross sectional view taken along line VI-VI in FIG. 4.

In the present embodiment, the pair of pump-side operation fluid passages 410 is formed in the pump-side port block 250, as described above.

As shown in FIG. 6, the pair of pump-side operation fluid passages 410 have first ends opened to an external surface so as to form pump-side operation fluid ports 410P while being fluidly connected to the pump main body 220 by way of kidney ports.

In the present embodiment, the pair of pump-side operation fluid passages 410 is arranged substantially parallel to each other.

Specifically, a first pump-side operation fluid passage 410 (F) out of the pair of pump-side operation fluid passages 410 is formed by a fluid bore perforated from a first side surface 251 of the pump-side port block 250, so that the pump-side operation fluid port 410P is positioned on the first side surface 251 of the pump-side port block 250, as shown in FIG. 6.

On the other hand, a second pump-side operation fluid passage 410(R) out of the pair of pump-side operation fluid passages 410 is formed by a fluid bore perforated from a second side surface 252 on the side opposite the first side surface 251 at a position opposite the first pump-side operation fluid passage 410(F) with the pump shaft 210 in between, so that the pump-side operation fluid port 410P is positioned on the second side surface 252 of the pump-side port block 250.

The pump-side port block 250A is provided with a bypass fluid passage 420 fluidly connecting between the pair of pump-side operation fluid passages 410, and a bi-directional relief valve 425 interposed in the bypass fluid passage 420, as shown in FIGS. 2 and 6.

According to such configuration, when one of the pair of operation fluid lines 400 has an abnormally high pressure, the fluid pressure of the high pressure side operation fluid line is relieved to the other low pressure side operation fluid line, thereby effectively preventing disadvantages such as leakage of operation fluid from the high pressure side operation fluid line.

The pump-side port block 250A is further provided with a pump-side charge fluid passage 450, which will be later described.

The pump shaft 210 is supported in a rotatable manner about its axis line by the pump case 230 while being operatively connected to the driving power source 20.

In the present embodiment, the pump shaft 210 is supported in a rotatable manner about its axis line by the pump case main body 240 and the pump-side port block 250 with its first end 211 forming an input end extending outward, as shown in FIGS. 4 and 5.

The pump main body 220 is supported in a relatively non-rotatable manner by the pump shaft 210 within the pump space 230S, as shown in FIGS. 4 and 5.

Specifically, the pump main body 220 includes a cylinder block 221 supported in a relatively non-rotatable manner by the pump shaft 210 so as to be positioned in the pump space 230S, and a piston unit 222 accommodated in the cylinder block 221 so as to be relatively non-rotatable but slidable in the axis line direction.

The cylinder block 221 slidably contacts the inner surface of the pump-side port block 250 so as to be fluidly connected to the pump-side operation fluid passage 410.

In the present embodiment, the hydraulic pump unit 200 is of a variable displacement type, as mentioned above.

Therefore, the hydraulic pump unit 200 includes a pump-side output adjustment member 260 for changing the supply/discharge fluid amount of the pump main body 220 according to the external operation, in addition to the above configuration.

The pump-side output adjustment member 260 includes a pump-side control shaft 261 supported by the pump case 230 in a rotatable manner about its axis line orthogonal to the axis line of the pump shaft 210 in a state accessible from the outside of the pump case 230; and a pump-side movable swash plate 262 operatively connected to an inner end of the pump-side control shaft 261, the pump-side movable swash plate 262 being configured so as to contact a free end of the piston unit 222 by way of a shoe, as shown in FIGS. 3 to 5.

The pump-side movable swash plate 262 is configured so as to slant about the axis line of the pump-side control shaft 261 according to the rotation of the pump-side control shaft 261 about its axis line, so that the sliding range of the piston unit 222 could be changed to adjust the supply/discharge fluid amount of the pump main body 220.

In the present embodiment, the pump-side output adjustment member 260 includes a pump-side operation arm 265 in addition to the above configuration.

As shown in FIGS. 3 and 5, the pump-side operation arm 265 is coupled to an outer end of the pump-side control shaft 261 in a relatively non-rotatable manner so as to be orthogonal to the axis line of the pump-side control shaft 261.

The pump-side operation arm 265 has a first end operatively connected to a pump operation member that is arranged in the vicinity of the driver's seat by way of an appropriate connecting member such as wire, and is configured so as to rotate the pump-side control shaft 261 about its axis line according to a manipulating operation to the pump operation member.

In the present embodiment, the pump-side output adjustment member 260 is provided with a pump-side slant range regulating mechanism 270 for regulating the slant range of the pump-side movable swash plate 262.

Specifically, the pump-side slant range regulating mechanism 270 includes a circular arc hole 271 formed in the pump-side operation arm 265 and a regulation pin 272 arranged in the pump case 230 so as to be engaged into the circular arc hole 271, as shown in FIGS. 3 and 5.

The circular arc hole 271 is formed into a circular arc shape having the axis line of the pump-side control shaft 261 as its center.

According to such configuration, the regulation pin 272 contacts the terminating end of the circular arc hole 271 so that the slant range of the pump-side movable swash plate 262 is reliably set.

In the illustrated embodiment, the circular arc hole 271 is formed at a second end, which is opposite the first end with the pump-side control shaft 261 in between, of the pump-side operation arm 265

Preferably, the regulation pin 272 is an eccentric pin having a proximal portion fixed to the pump case 230 and a distal portion engaged into the circular arc hole 271, the distal portion being eccentric with respect to the proximal portion.

The relative position of the regulation pin 272 with respect to the circular arc hole 271 could be easily adjusted by having the regulation pin 272 as the eccentric pin.

Furthermore, the hydraulic pump unit 200 includes a shock absorber 280 with one end fixed, and a coupling arm 285 coupled to a movable end of the shock absorber 280 in the present embodiment, as shown in FIGS. 3 to 5.

The coupling arm 285 is configured so as to integrally swing with the pump-side operation arm 265 about the pump-side control shaft 261.

According to such configuration, the slant operation of the pump-side movable swash plate 262 becomes slower, thereby effectively preventing the traveling speed of the vehicle from drastically changing.

The coupling arm 285 is formed as a separate body from the pump-side operation arm 265 in the present embodiment, as shown in FIGS. 3 to 5, but may obviously be integrated.

Furthermore, the hydraulic pump unit 200 includes an auxiliary hydraulic pump unit operatively driven by the pump shaft 210 in addition to the above configuration, as shown in FIGS. 2 to 4.

In the embodiment shown, the hydraulic pump unit 200 includes a first auxiliary hydraulic pump unit 500 and a second auxiliary hydraulic pump unit 550 as the auxiliary hydraulic pump unit.

The first auxiliary hydraulic pump unit 500 is used as a fluid source of a hydraulic actuator for raising and lowering the bucket 2 and the like, and the second auxiliary hydraulic pump unit 550 is used as a fluid source for replenishing the operation fluid to the pair of operation fluid lines 400 via a charge line 430, which is later described (see FIG. 2).

Specifically, the pump shaft 210 has a second end 212, which is opposite the first end 211 forming the input end and passes through the pump-side port block 250 to extend outside, as shown in FIGS. 4 and 5.

The first auxiliary hydraulic pump unit 500 includes a first auxiliary pump shaft 510 operatively connected to the second end 212 of the pump shaft 210, a first auxiliary pump main body 520 (see FIG. 2) operatively driven by the first auxiliary pump shaft 510, and a first auxiliary pump case 530 surrounding the first auxiliary pump main body 520.

In the present embodiment, the first auxiliary pump shaft 510 is coupled to the pump shaft 210 in a relatively non-rotatable manner about the axis line by way of a coupling 545, as shown in FIGS. 4 and 5.

The first auxiliary pump main body 520 may take various forms, and, for example, is of a high-pressure type in which external gears are engaged to each other.

The first auxiliary pump case 530 is coupled to the pump-side port block 250 by way of a spacer member 540 that is coupled to the pump-side port block 250 so as to surround the coupling 545.

As shown in FIGS. 2 to 4, the first auxiliary pump case 530a is formed with a first suction fluid passage 610 having a first end opened to an external surface to form a first suction port 610P and a second end fluidly connected to a suction port of the first auxiliary pump main body 520, and a first discharge fluid passage 611 having a first end fluidly connected to a discharge port of the first auxiliary pump main body 520 and a second end opened to an external surface to form a first discharge port 611P.

The first suction port 610P is fluidly connected to a fluid reservoir such as a fluid tank 600 by way of an appropriate external suction conduit 615.

The first discharge port 611P is fluidly connected to the corresponding hydraulic actuator by way of an appropriate external conduit 616.

The second auxiliary hydraulic pump unit 550 includes a second auxiliary pump shaft (not shown) operatively connected to the first auxiliary pump shaft 510, a second auxiliary pump main body 570 operatively driven by the second auxiliary pump shaft (see FIG. 2), and a second auxiliary pump case 580 coupled to the first auxiliary pump case 530 so as to surround the second auxiliary pump main body 570 (see FIG. 4).

The second auxiliary pump shaft may be integrally formed or may be formed as a separate body with respect to the first auxiliary pump shaft 510 as long as it is relatively non-rotatable about the axis line with respect to the first auxiliary pump shaft 510.

The second auxiliary pump main body 570 is, for example, of a high-pressure type in which external gears are engaged to each other, similar to the first auxiliary pump main body 520.

The second auxiliary pump case 580 is coupled to the first auxiliary pump case 530, as shown in FIG. 4.

As shown in FIGS. 2 to 4, the second auxiliary pump case 580 is formed with a second suction fluid passage 620 having a first end opened to an external surface to form a second suction port 620P and a second end fluidly connected to a suction port of the second auxiliary pump main body 570, and a second discharge fluid passage 621 having a first end fluidly connected to a discharge port of the second auxiliary pump main body 520 and a second end opened to an external surface to form a second discharge port 621P.

The second suction port 620P is fluidly connected to the fluid reservoir such as the fluid tank 600 by way of an appropriate external suction conduit 615.

To the second discharge port 621P, a common charge conduit 460 is fluidly connected, which is later described.

Figure 7:
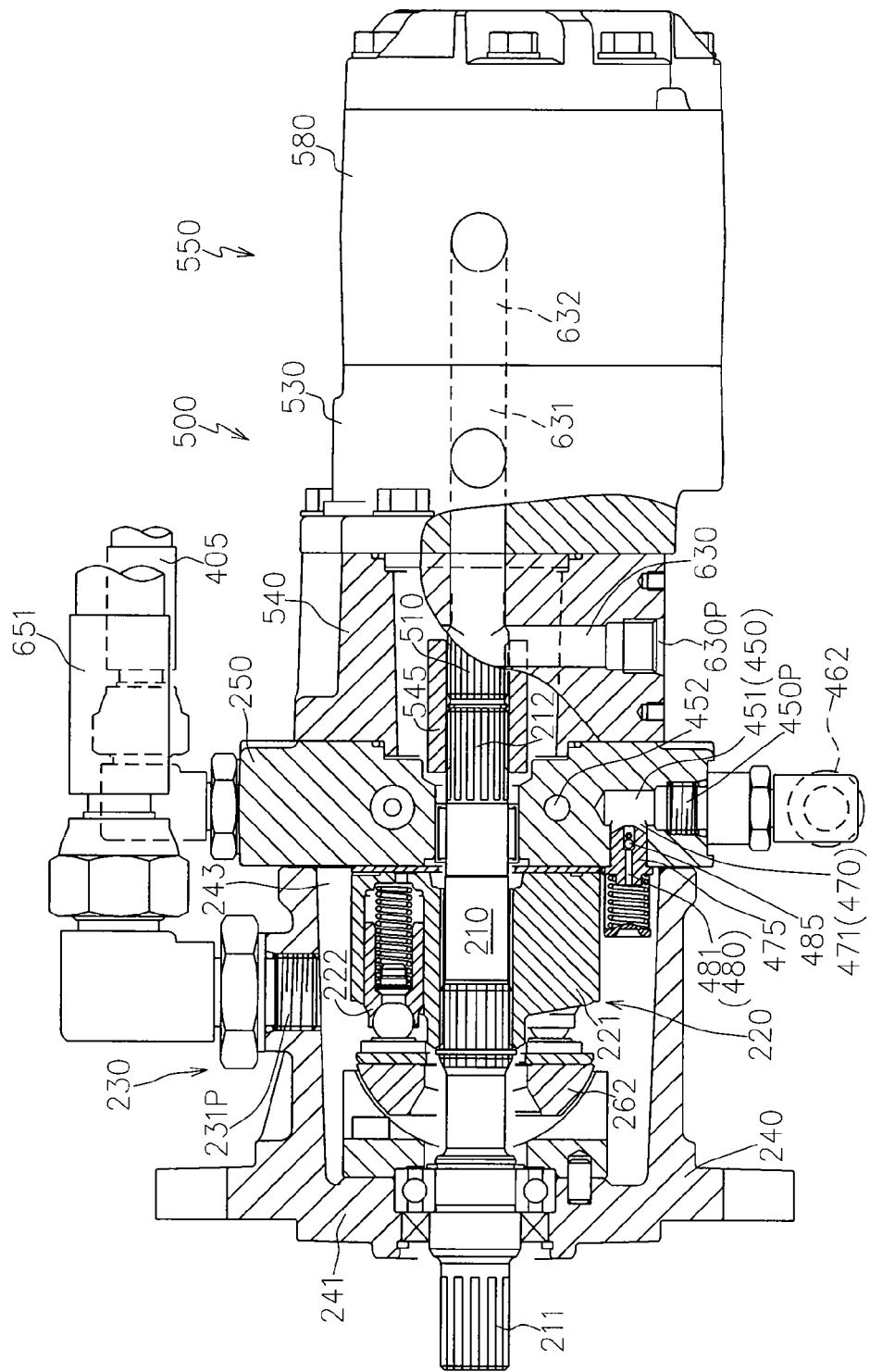
FIG. 7 is a longitudinal side view of a hydraulic pump unit modified from that shown in FIG. 4.

The first and second auxiliary hydraulic pump units 500, 550 respectively include first and second suction ports 610P, 620P, which are independent to each other, in the present embodiment (see FIG. 4), as described above, but instead the first and second auxiliary hydraulic pump units 500, 550 may be configured so as to include a common suction port 630P (see FIG. 7).

In a modified embodiment shown in FIG. 7, the suction ports of the first and second auxiliary hydraulic pump main bodies 520, 570 are fluidly connected to the fluid reservoir by way of a common suction fluid passage 630 formed in the spacer member 540, a first suction fluid passage 631 formed in the first auxiliary pump case 530, and a second suction fluid passage 632 formed in the second auxiliary pump case 580.

Specifically, the common suction fluid passage 630 has a first end opened to an external surface to form the common suction port 630P and a second end opened to a contacting surface with the first auxiliary hydraulic pump case 530.

The first suction fluid passage 631 has a first end opened to a contacting surface with the spacer member 540 so as to fluidly connect to the second end of the common suction fluid passage 630, a second end opened to a contacting surface with the second auxiliary hydraulic pump case 580, and an intermediate part, which is between the first and second end, fluidly connected to the suction port of the first auxiliary pump main body 520.

The second suction fluid passage 632 has a first end opened to a contacting surface with the first auxiliary hydraulic pump case 530 so as to fluidly connect to the second end of the first suction fluid passage 631, and a second end fluidly connected to the suction port of the second auxiliary pump main body 570.

The hydraulic motor unit 300 will now be described.

Figure 8:
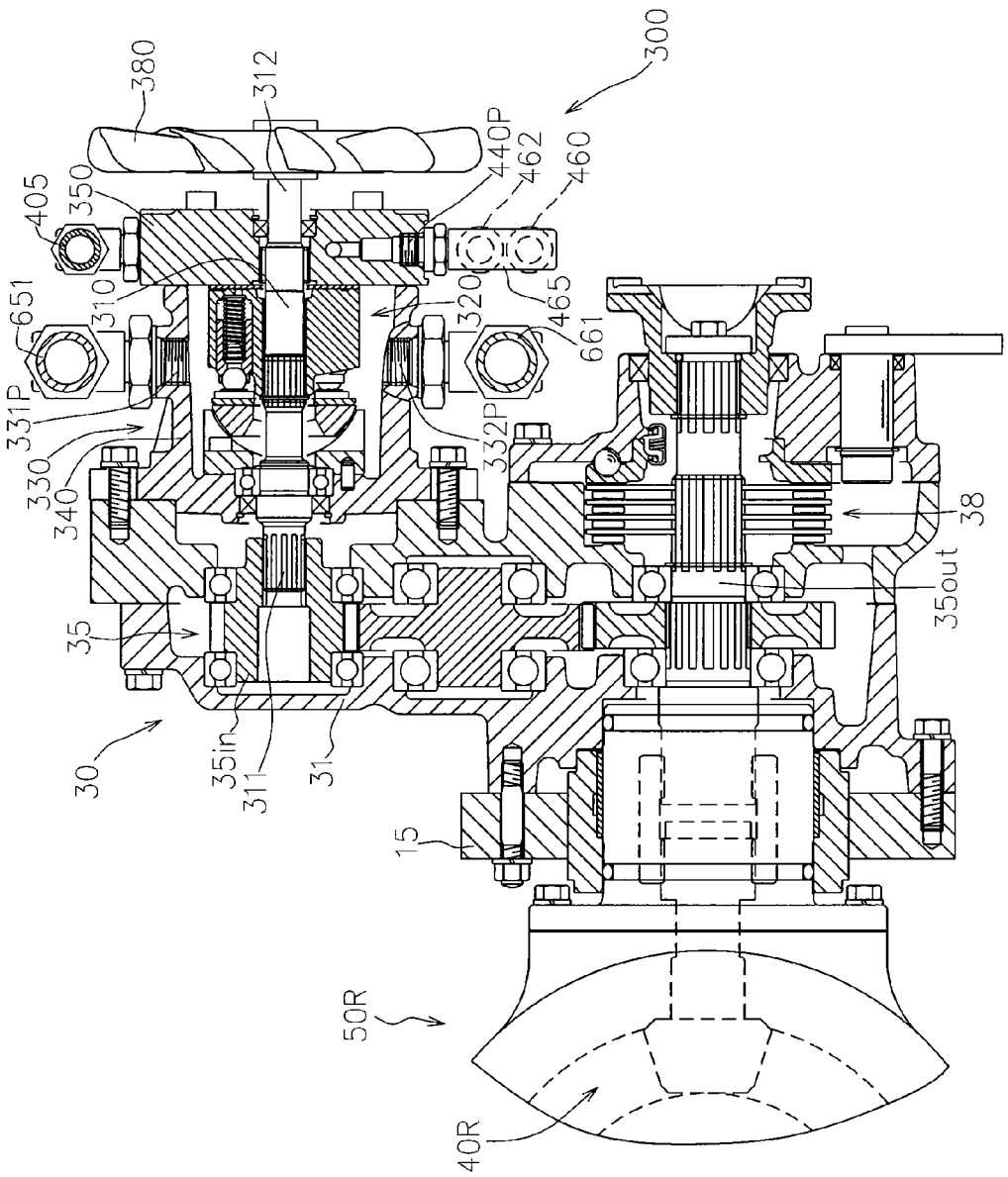
FIG. 8 is a partial longitudinal side view of the vicinity of a hydraulic motor unit of the HST according to the embodiment 1.

FIG. 8 shows a partial longitudinal side view of the vicinity of the hydraulic motor unit 300.

As shown in FIGS. 1 and 8, the hydraulic motor unit 300 is arranged spaced apart from the hydraulic pump unit 200, and is fluidly connected to the hydraulic pump unit 200 by way of the pair of operation fluid lines 400, as shown in FIG. 2.

Specifically, the hydraulic motor unit 300 includes a motor main body 320 fluidly connected to the pump main body 220 by way of the pair of operation fluid lines 400, a motor shaft 310 for supporting the motor main body 320 in a relatively non-rotatable manner, and a motor case 330 for supporting the motor shaft 310 in a rotatable manner about its axis line while accommodating the motor main body 320, as shown in FIGS. 2 and 8.

The motor case 320 could be directly or indirectly supported by the supporting member such as the vehicle frame 10 independently.

In the present embodiment, the motor case 320 is coupled to the power dividing device 30, as shown in FIG. 8.

That is, a pair of brackets 15 configured to support the rear axle case 50R in a swingable manner about the axis line along the fore and aft direction of the vehicle is connected to the rear frame 10R, as shown in FIG. 1.

The power dividing device 30 is supported by the bracket 15 positioned on the front side of the vehicle out of the pair of brackets 15, and the motor case 330 is coupled to the power dividing device 30 (see FIGS. 1 and 8).

The motor case 300A is formed with a pair of motor-side operation fluid passages 415 configuring one part of the pair of operation fluid lines 400 (see FIG. 2).

Figure 9:
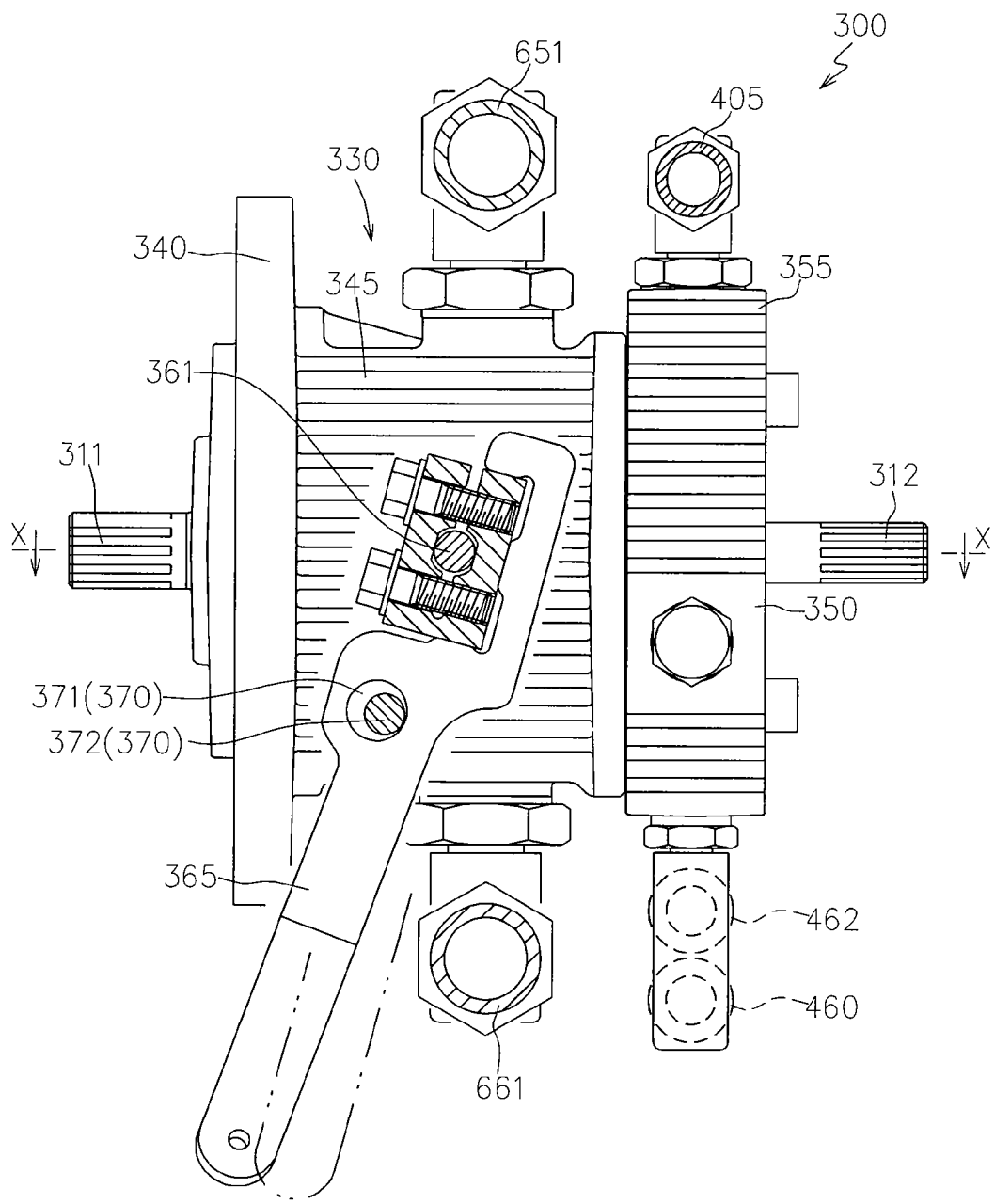
FIG. 9 is a side view of the hydraulic motor unit shown in FIG. 8.

FIG. 9 shows a side view of the hydraulic motor unit 300.

Figure 10:
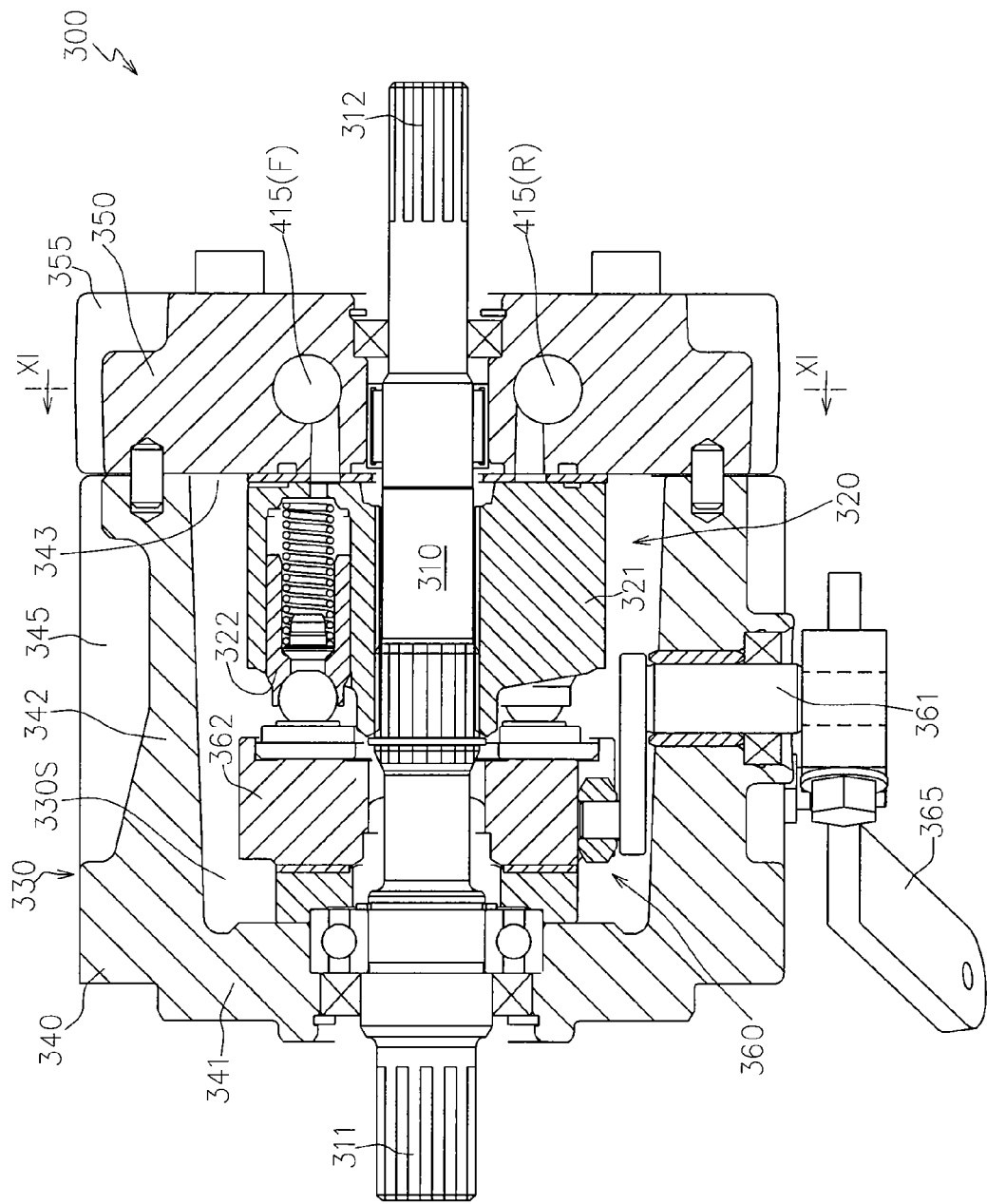
FIG. 10 is a cross sectional view taken along line X-X in FIG. 9.
Figure 11:
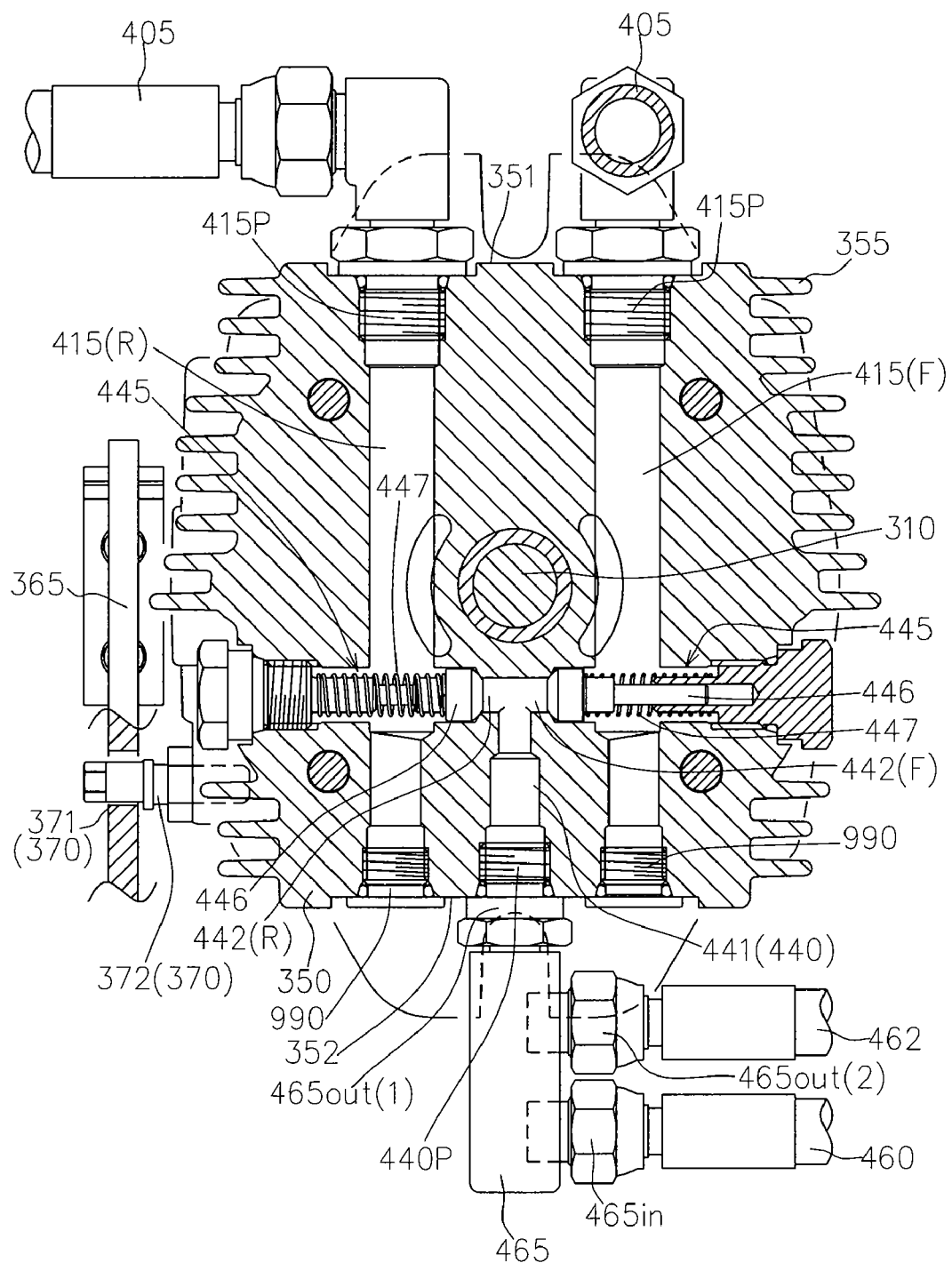
FIG. 11 is a cross sectional view taken along line XI-XI in FIG. 10.

FIGS. 10 and 11 show cross sectional views taken along line X-X in FIG. 9 and along line XI-XI in FIG. 10, respectively.

Specifically, the motor case 330 includes a motor case main body 340; and a motor-side port block 350 removably coupled to the motor case main body 340, the motor-side port block 350 being formed with the pair of motor-side operation fluid passages 415, as shown in FIGS. 9-11.

As shown in FIG. 10, the motor case main body 340 includes an end wall 341 extending in a direction orthogonal to the axis line direction of the motor shaft 310, and a peripheral wall 342 extending in the axis line direction of the motor shaft 310 from the peripheral edge of the end wall 341 so as to surround the motor main body 320, and an opening 343, through which the motor main body 320 can be inserted, formed at a free end side opposite the end wall 341 of the peripheral wall 342.

In the present embodiment, the motor case main body 340 is removably coupled to the power dividing device 30 by way of the end wall 341.

The motor-side port block 350 is removably coupled to the motor case main body 340 so as to close the opening 343.

That is, the motor case 330 is configured to form a motor space 330S for accommodating the motor main body 320 with the end wall 341 and the peripheral wall 342 of the motor case main body 340 and the motor-side port block 350 in the present embodiment.

The motor space 330S is preferably for fluid storage.

The pair of motor-side operation fluid passages 415 is formed in the motor-side port block 350 in the present embodiment, as described above.

As shown in FIG. 11, the pair of pump-side operation fluid passages 415 respectively have first ends opened to an external surface to form motor-side operation fluid ports 415P while being fluidly connected to the motor main body 320 by way of the kidney ports.

In the present embodiment, the pair of motor-side operation fluid passages 415 is arranged substantially parallel to each other.

Specifically, a first motor-side operation fluid passage 415 (F) out of the pair of motor-side operation fluid passages 415 is formed by a fluid bore perforated in such a manner that its first end is opened to a first side surface 351 of the motor-side port block 350, a second end is opened to a second side surface on the side opposite the first side surface, and an intermediate part between both ends is fluidly connected to the motor main body 320 by way of the kidney port, as shown in FIG. 11.

The first end forms the motor-side operation fluid port 415P, and the second end is blocked by a plug 990.

The second motor-side operation fluid passage 415(R) out of the pair of motor-side operation fluid passages 415 is formed, in a same manner as the first motor-side operation fluid passage 415(F), at a position opposite the first motor-side operation fluid passage 415(F) with the motor shaft 310 in between.

That is, the motor-side operation fluid ports 415P of the pair of motor-side operation fluid passages 415 are positioned on the same side surface 315 of the motor-side port block 350 in the present embodiment.

The motor-side port block 350 is further formed with a motor-side charge fluid passage 440 as shown in FIG. 11, which will be later described.

The motor-side port block 350 preferably includes a plurality of ribs 355 on the external surface, as shown in FIGS. 9 to 11.

The ribs 355 could increase the surface area of the motor-side port block 350, thereby enhancing the cooling efficiency for the operation fluid flowing through the motor-side operation fluid passage 415 and the replenishing fluid flowing through the motor-side charge fluid passage 440, which is later described.

Similarly, a plurality of ribs 345 are also preferably arranged on the external surface of the motor case main body 340 (see FIGS. 9 and 10).

The ribs 345 could enhance the cooling efficiency for the stored fluid in the motor space 330S, thereby effectively cooling the motor main body 320 accommodated in the motor space 330S.

The motor shaft 310 is supported in a rotatable manner about its axis line by the motor case 330 in a state capable of operatively driving the driving-wheels 60 (front wheel 60F and rear wheel 60R in the present embodiment).

In the present embodiment, the motor shaft 310 operatively drives both the front wheel 60F and the rear wheel 60R by way of the power dividing device 30, as shown in FIGS. 2 and 8.

Specifically, the power dividing device 30 includes a housing 31 supported by the rear frame 10R by way of the bracket 15, and a power dividing mechanism 35 accommodated in the housing 31, as shown in FIG. 8.

The motor shaft 310 is supported in a rotatable manner about its axis line by the motor case main body 330 and the motor-side port block 350 in a state that its first end 311 forming an output end extends outward so as to be operatively connected to an input part 35 in of the power dividing mechanism 35, as shown in FIG. 8.

The reference character 38 in FIG. 8 is a brake mechanism for applying brake force to an output part 35 out of the power dividing mechanism 35.

The motor main body 320 is supported in a relatively non-rotatable manner by the motor shaft 310 so as to be positioned in the motor space 330S, as shown in FIG. 10.

Specifically, the motor main body 320 includes a cylinder block 321 supported in a relatively non-rotatable manner by the motor shaft 310 in the motor space 330S, and a piston unit 322 accommodated in the cylinder block 321 so as to be relatively non-rotatable about its axis line and slidable in its axis line direction.

The cylinder block 321 slidably contacts an inner surface of the motor-side port block 350 so as to be fluidly connected to the motor-side operation fluid passages 415.

In the motor embodiment, the hydraulic motor unit 300 is of a variable displacement type, as mentioned above.

Therefore, the hydraulic motor unit 300 includes a motor-side output adjustment member 360 for changing the supply/discharge fluid amount of the motor main body 320 according to the external operation, in addition to the above configuration.

The motor-side output adjustment member 360 includes a motor-side control shaft 361 supported by the motor case 330 in a rotatable manner about its axis line orthogonal to the axis line of the motor shaft 310 in a state accessible from the outside of the motor case 330; and a motor-side movable swash plate 362 operatively connected to an inner end of the motor-side control shaft 361, the motor-side movable swash plate 362 being configured so as to contact a free end of the piston unit 322 by way of a shoe, as shown in FIG. 10.

The motor-side movable swash plate 362 is configured so as to slant about the axis line of the motor-side control shaft 361 according to the rotation of the motor-side control shaft 361 about its axis line, so that the sliding range of the piston unit 322 is changed to adjust the supply/discharge fluid amount of the motor main body 320.

In the present embodiment, the motor-side output adjustment member 360 includes a motor-side operation arm 365 in addition to the above configuration.

As shown in FIGS. 9 and 10, the motor-side operation arm 365 is coupled in a relatively non-rotatable manner to an outer end of the motor-side control shaft 361 so as to be orthogonal to the axis line of the motor-side control shaft 361.

The motor-side operation arm 365 has a first end operatively connected to a motor operation member that is arranged in the vicinity of the driver's seat by way of an appropriate connecting member such as a wire, and is configured so as to rotate the motor-side control shaft 361 about its axis line according to a manipulated operation to the motor operation member.

In the present embodiment, the motor-side output adjustment member 360 is provided with a motor-side slant range regulating mechanism 370 for regulating the slant range of the motor-side movable swash plate 362.

Specifically, the motor-side slant range regulating mechanism 370 includes a hole 371 formed in the motor-side operation arm 365 and a regulation pin 372 arranged in the motor case 230, the regulation pin 372 being configured so as to be engaged into the hole 371 with a gap, as shown in FIG. 9.

According to such configuration, the motor-side operation arm 365 is swingable only within a range in which the hole 371 relatively could move with respect to the regulation pin 372, whereby the slant range of the motor-side movable swash plate 362 is reliably set.

In the present embodiment, the hydraulic motor unit 300 is configured to perform a two-speed change of H level and L level.

That is, the motor-side slant range regulating mechanism 370 is configured so that the motor-side movable swash plate 362 is slanted between a maximum slanted position where the supply/discharge amount of the motor main body 320 is a maximum, and a minimum slanted position where the supply/discharge amount of the motor main body 320 is a minimum.

In FIG. 9, the position of the motor-side operation arm 365 corresponding to the maximum slanted position is shown with a solid line, and the position of the motor-side operation arm 365 corresponding to the minimum slanted position is shown with a chain double-dashed line.

The motor-side movable swash plate 362 is locked at the maximum slanted position or the minimum slanted position is performed by a detent mechanism (not shown) arranged in the motor operation member.

Preferably, the regulation pin 372 is an eccentric pin having a proximal portion fixed to the motor case 330 and a distal portion engaged into the hole 371, the distal portion being eccentric with respect to the proximal portion.

By having the regulation pin 372 as the eccentric pin, the relative position of the regulation pin 372 with respect to the hole 371 is easily adjusted.

Furthermore, the hydraulic motor unit 300 includes a cooling fan 380 operatively rotatably driven by the motor shaft 310 in the present embodiment, as shown in FIG. 8.

Specifically, the motor shaft 380 is configured so that its second end 312 on the side opposite the first end 311 passes through the motor-side port block 350 to extend outward.

The cooling fan 380 is supported in a relatively non-rotatable manner at the second end 312 of the motor shaft 311.

The hydraulic motor unit 300, a pair of operation fluid conduits 405 for fluidly connecting the hydraulic motor unit 300 and the hydraulic pump unit 200, and charge conduits 460, 462 for replenishing the operation fluid to the pair of operation fluid lines 400 can be effectively cooled according to such configuration.

A hydraulic circuit of the HST 100 according to the present embodiment will now be described.

The HST 100 includes the pair of operation fluid lines 400 for fluidly connecting the pump main body 220 and the motor main body 320 so as to form a closed circuit, and a charge line 430 for replenishing the operation fluid to the closed circuit, as shown in FIG. 2.

The pair of operation fluid lines 400 includes the pair of pump-side operation fluid passages 410, the pair of motor-side operation fluid passages 415, and a pair of operation fluid conduits 405 having first ends fluidly connected to the pump-side operation fluid ports 410P and second ends fluidly connected to the motor-side operation fluid ports 415P.

The charge line 430 is configured so as to have a first end fluidly connected to a fluid source and a second end fluidly connected to at least one of the pair of motor-side operation fluid passages 415.

That is, in the present embodiment, the hydraulic motor unit 300a is provided with a motor-side charge fluid passage 440 having a first end opened to an outside to form a motor-side charge port 440P and a second end fluidly connected to the motor-side operation fluid passage 415, and a motor-side check valve 445 interposed in the motor-side charge fluid passage 440 to allow the fluid to flow from the motor-side charge port 440P to the motor-side operation fluid passage 415 while preventing the reverse flow, as shown in FIG. 2.

The motor-side charge fluid passage 440 and the motor-side check valve 445 are arranged in the motor-side port block 350 in the present embodiment, as shown in FIG. 11.

The charge line 430 is configured so as to replenish the operation fluid to both of the pair of motor-side operation fluid passages 415 in the present embodiment, as shown in FIG. 2.

Specifically, the motor-side charge fluid passage 440 includes a motor-side common charge fluid passage 441 having a first end opened to an outside to form the motor-side charge port 440P; a motor-side first charge fluid passage 442(F) for fluidly connecting the motor-side common charge fluid passage 441 to a motor-side first operation fluid passage 415(F), out of the pair of motor-side operation fluid passages 415, which has a negative pressure in a time when the driving-wheel 60 rotates in the forward direction; and a motor-side second charge fluid passage 442(R) for fluidly connecting the motor-side common charge fluid passage 441 to a motor-side second operation fluid passage 415(R), out of the pair of motor-side operation fluid passages 415, which has a negative pressure in a time when the driving-wheel 60 rotates in the rearward direction, as shown in FIGS. 2 and 11.

The motor-side check valve 445 is interposed in each of the motor-side first and second charge fluid passages 442(F), 442(R).

The HST 100 according to the present embodiment is configured so as to replenish the operation fluid to the motor-side operation fluid passage 415, whereby the free-wheel phenomenon is effectively prevented from occurring at the driving-wheel 60 so that the engine brake operation is effectively applied to the driving-wheel 60.

That is, the motor main body 320 operatively connected to the driving-wheel 60 intends to unintentionally perform pump action in some cases, for example, when the working vehicle travels downhill.

When such unintentional pump action of the motor main body occurs in the HST of a type in which the hydraulic pump unit and the hydraulic motor unit, which are arranged spaced apart, are fluidly connected by way of a pair of operation fluid conduits, the suction amount of the operation fluid by the motor main body tends to become shorter than the discharge amount of the operation fluid by the pump main body due to the flow path resistance of the operation fluid conduits, resulting in a negative pressure occurring in one of the pair of operation fluid conduits.

The fluid is replenished through the charge line to the one operation fluid conduit where negative pressure is created, but the replenishing fluid supplied through the charge line is also subjected to the flow path resistance of the pair of operation fluid conduits in the conventional HST since the charge line is configured to replenish the operation fluid to the hydraulic pump unit.

Therefore, the negative pressure occurring in one operation fluid conduit cannot be effectively resolved even if the fluid is replenished by the charge line, and the air is suctioned from the suction port of the motor main body, resulting in posing a problem in which the free-wheel phenomenon of the driving-wheel tends to easily occur.

The HST 100 according to the present embodiment, on the other hand, is configured so as to replenish the operation fluid to the motor-side operation fluid passage 415 through the charge line 430, as described above.

According to such a configuration, the operation fluid is effectively replenished to the vicinity of the suction port of the motor main body 320, whereby the suction amount of the motor main body 320 is effectively prevented from becoming shorter than the discharge amount of the pump main body 220.

Therefore, the occurrence of the free-wheel phenomenon could be suppressed so that the engine brake is effectively applied to the driving-wheel 60.

In the present embodiment, the charge line 430 is configured to replenish the operation fluid to both of the pair of the motor-side operation fluid passages 415, as described above. However, the vehicle travels in the rearward direction less frequently than traveling in the forward direction, and the cases of requiring the engine brake operation when moving the vehicle backward are few.

Therefore, in a case where it is needed to reduce the cost, the charge line 430 may be configured to replenish the operation fluid only to the motor-side first operation fluid passage 415(F), out of the motor-side operation fluid passages 415, which has a negative pressure when the driving-wheel 60 rotates in the forward direction.

In the present embodiment, the charge line 430 is configured to replenish the operation fluid to the pair of pump-side operation fluid passages 410 in addition to the pair of motor-side operation fluid passages 415, as shown in FIG. 2.

Specifically, the charge line 430 includes a pump-side charge fluid passage 450 formed in the hydraulic pump unit 200 in addition to the motor-side charge fluid passage 440.

The pump-side charge fluid passage 450 is formed in the pump-side port block 250 in the present embodiment.

Specifically, the pump-side charge fluid passage 450 includes a pump-side common charge fluid passage 451 having a first end opened to an outside to form a pump-side charge port 450P; a pump-side first charge fluid passage 452(F) for fluidly connecting the pump-side common charge fluid passage 451 to a pump-side first operation fluid passage 410(F), out of the pair of pump-side operation fluid passages 410, which has a negative pressure when the driving-wheel 60 rotates in the forward direction; and a pump-side second charge fluid passage 452(R) for fluidly connecting the pump-side common charge fluid passage 451 to a pump-side second operation fluid passage 410(R), out of the pair of pump-side operation fluid passages 410, which has a negative pressure when the driving-wheel 60 rotates in the rearward direction, as shown in FIG. 6.

A pump-side check valve 455 for allowing the fluid to flow from the pump-side charge port 450P to the corresponding pump-side operation fluid passage 410 while preventing the reverse flow in each of the pump-side first charge fluid passage 452(F) and the pump-side second charge fluid passage 452(R).

In a case where it is needed to reduce the cost, the pump-side second charge fluid passage 452(R) may be omitted due to the same reason as in the motor-side charge fluid passage 440.

The hydraulic pump unit 200A is preferably provided with a flow rate control valve 459 for communicating a primary side and a secondary side of the pump-side check valve 455 by way of a throttle, as shown in FIG. 2.

By arranging the flow rate control valve 459, it is possible to effectively ensure the neutral region of the HST 100.

In the present embodiment, the flow rate control valve 459 is annexed to the pump-side check valve 455, as shown in FIG. 6.

More preferably, the throttle is a variable throttle configured so that the opening width becomes smaller as the hydraulic pressure of the corresponding pump-side operation fluid passage 410 becomes higher.

By providing the configuration, the neutral region of the HST 100 could be effectively ensured while preventing the transmission efficiency of the HST 100 from worsening.

The flow rate control valve 459 may obviously be arranged in the hydraulic motor unit 300 (see FIG. 14 mentioned below).

In a case where the charge line 430 is configured to replenish the operation fluid to both the motor-side operation fluid passage 415 and the pump-side operation fluid passage 410 as in the present embodiment, the suction amount of the motor main body 320 could be effectively prevented from becoming shorter than the discharge amount of the pump main body 220 by having the flow path resistance of a replenishing line (hereinafter referred to as motor-side charge line) for replenishing the operation fluid to the motor-side operation fluid passage 415 smaller than the flow path resistance of the replenishing line (hereinafter referred to as pump-side charge line) for replenishing the operation fluid to the pump-side operation fluid passage 410.

In the present embodiment, the flow path resistance of the motor-side charge line is made smaller than that of the pump-side charge line by having the motor-side charge line shorter than the pump-side charge line.

That is, in the present embodiment, the charge line 430 includes, in addition to the motor-side charge fluid passage 440 and the pump-side charge fluid passage 450, a common charge conduit 460 having a first end directly or indirectly fluidly connected to the fluid reservoir; a three-sided joint 465 having a flow-in end 465in fluidly connected to a second end of the common charge conduit 460 and a first flow-out end 465out(1) fluidly connected to the motor-side charge port 440P directly or by way of a motor-side charge conduit 461 (see FIGS. 12 and 13); and a pump-side charge conduit 462 having a first end fluidly connected to a second flow-out end 465out(2) of the three-sided joint 465 and a second end fluidly connected to the pump-side charge port 450P, the pump-side charge conduit 462 having a conduit length longer than the motor-side charge conduit 461, as shown in FIGS. 2, 6, and 11.

The three-sided joint 465 is configured so that the first flow-out end 465out(1) is directly connected to the motor-side charge port 440P in the illustrated embodiment (see FIG. 11).

In place of or in addition to having the length of the motor-side charge line shorter than the length of the pump-side charge line, the flow path resistance of the motor-side charge line could be made smaller than the flow path resistance of the pump-side charge line by having the flow path diameter of the motor-side charge line greater than the flow path diameter of the pump-side charge line.

In the present embodiment, the second auxiliary hydraulic pump unit 550 serves as the fluid source of the charge line 430, as mentioned above.

Therefore, the first end of the common charge conduit 460 is fluidly connected to the second discharge port 621P, as shown in FIG. 2.

In the embodiment, the external suction conduit 615, the second suction fluid passage 620, and the second discharge fluid passage 621 also configure one part of the charge line 430.

The HST 100 further includes a charge pressure setting line 470 for setting the hydraulic pressure of the charge line 430, as shown in FIG. 2.

In the present embodiment, the charge pressure setting line 470 is arranged in the hydraulic pump unit 200, as shown in FIG. 2.

Specifically, the charge pressure setting line 470 includes a charge pressure setting fluid passage 471 formed in the pump-side port block 250 and a charge pressure setting relief valve 475 interposed in the charge pressure setting fluid passage 471.

The charge pressure setting fluid passage 471 has a first end fluidly connected to the pump-side common charge fluid passage 451 and a second end opened into the pump space 230S.

The charge pressure setting line 470 may obviously be arranged in the hydraulic motor unit 300.

In the configuration, the charge pressure setting fluid passage 471 is formed in the motor-side port block 350 so as to have a first end fluidly connected to the motor-side common charge fluid passage 441 and a second end opened into the motor space 330S.

In a case where the pump space 230S is capable of storing fluid as in the present embodiment, a pump-side self-suction line 480 is preferably arranged in the hydraulic pump unit 200, as shown in FIG. 2.

The pump-side self-suction line 480 includes a pump-side self-suction fluid passage 481 having a first end opened into the pump space 230S and a second end fluidly connected to the pump-side common charge fluid passage 451, and a check valve 485 for allowing the fluid to flow from the first end to the second end of the pump-side self-suction fluid passage 480 while preventing the reverse flow.

In the present embodiment, the pump-side self-suction fluid passage 481 is formed in a valve main body of the charge pressure setting relief valve 475, as shown in FIG. 4.

By arranging the pump-side self-suction line 480, the free-wheel phenomenon of the driving-wheel 60 in a time when the driving power source 20 is stopped could be effectively prevented.

For example, when the working vehicle is stopped on the hill in a state where the driving power source 20 is stopped, the rotational force is applied to the motor shaft 310 operatively connected to the driving-wheel 60, and then the motor main body 320 intends to unintentionally perform the pump action.

In this case, if the pair of operation fluid lines 400 is filled with operation fluid, the brake force applies to the motor main body 320 via the operation fluid, but the pressure of one of the operation fluid lines 400 becomes high due to the pump action of the motor main body 320, and the operation fluid might leak out from the operation fluid line on the high pressure side.

If such leak of the operation fluid occurs, the fluid circulates from the negative pressure side operation fluid line to the high pressure side operation fluid line, resulting in promoting the operation fluid leak from the high pressure side operation fluid line, and eventually leaking out all the operation fluid from the pair of operation fluid lines 400 so that the driving-wheel 60 might start to freely rotate.

On the other hand, by arranging the self-suction line 480, if one of the pair of operation fluid lines 400 has a negative pressure, the fluid is automatically replenished from the pump space 230S to the operation fluid line 400 of negative pressure.

The free-wheel phenomenon of the driving-wheel 60 is thereby effectively prevented.

More preferably, a motor-side self-suction line 480' (see FIG. 14) may be arranged in the hydraulic motor unit 300 in place of or in addition to the pump-side self-suction line 480.

For example, the motor-side self-suction line 480' may include a motor-side self-suction fluid passage 481' (see FIG. 14) formed in the motor-side port block 350 so as to have a first end opened into the motor space 330S and a second end fluidly connected to the motor-side common charge fluid passage 441, and a check valve 485 for allowing the fluid to flow from the first end to the second end of the motor-side self-suction fluid passage 481' while preventing the reverse flow.

By arranging the motor-side self-suction line 480', the operation fluid can be rapidly replenished to the vicinity of the motor main body 320.

Accordingly, the free-wheel phenomenon caused by the unintentional pump action of the motor main body 320 could be more effectively prevented.

The HST 100 according to the present embodiment includes a communicating line 650 for fluidly connecting the pump space 230S and the motor space 330S, both of which are capable of storing fluid, and a discharge line 660 for fluidly connecting one of the pump space 230S and the motor space 330S to the fluid tank 600, in addition to the various hydraulic lines.

In the present embodiment, the charge pressure setting relief valve 475 is arranged in the hydraulic pump unit 200, as mentioned above.

Therefore, the fluid amount that flows into the pump space 230S becomes greater than the fluid amount that flows into the motor space 330S.

In view of such a point, the discharge line 660 is configured to fluidly connect the motor space 330S to the fluid tank 600 in the present embodiment.

According to such a configuration, the fluid overflowed from the pump space 230S flows into the motor space 330S via the communicating line 650, and thereafter, returns to the fluid tank 600 via the discharge line 660. The stored fluid is thus effectively prevented from retaining in the pump space 230S and the motor space 330S.

Specifically, the communicating line 650 includes a pump-side first port 231P formed in the pump case 230, a motor-side first port 331P formed in the motor case 330, and a communicating conduit 651 for fluidly connecting the pump-side port 231P and the motor-side first port 331P, as shown in FIGS. 2, 4, 8 and 9.

The discharge line 660 includes a motor-side second port 332P formed in the motor case 330, and a discharge conduit 661 for fluidly connecting the motor-side second port 332P and the fluid tank 600.

Embodiment 2

Another embodiment of the HST according to the present invention will now be described with reference to the attached drawings.

Figure 12:
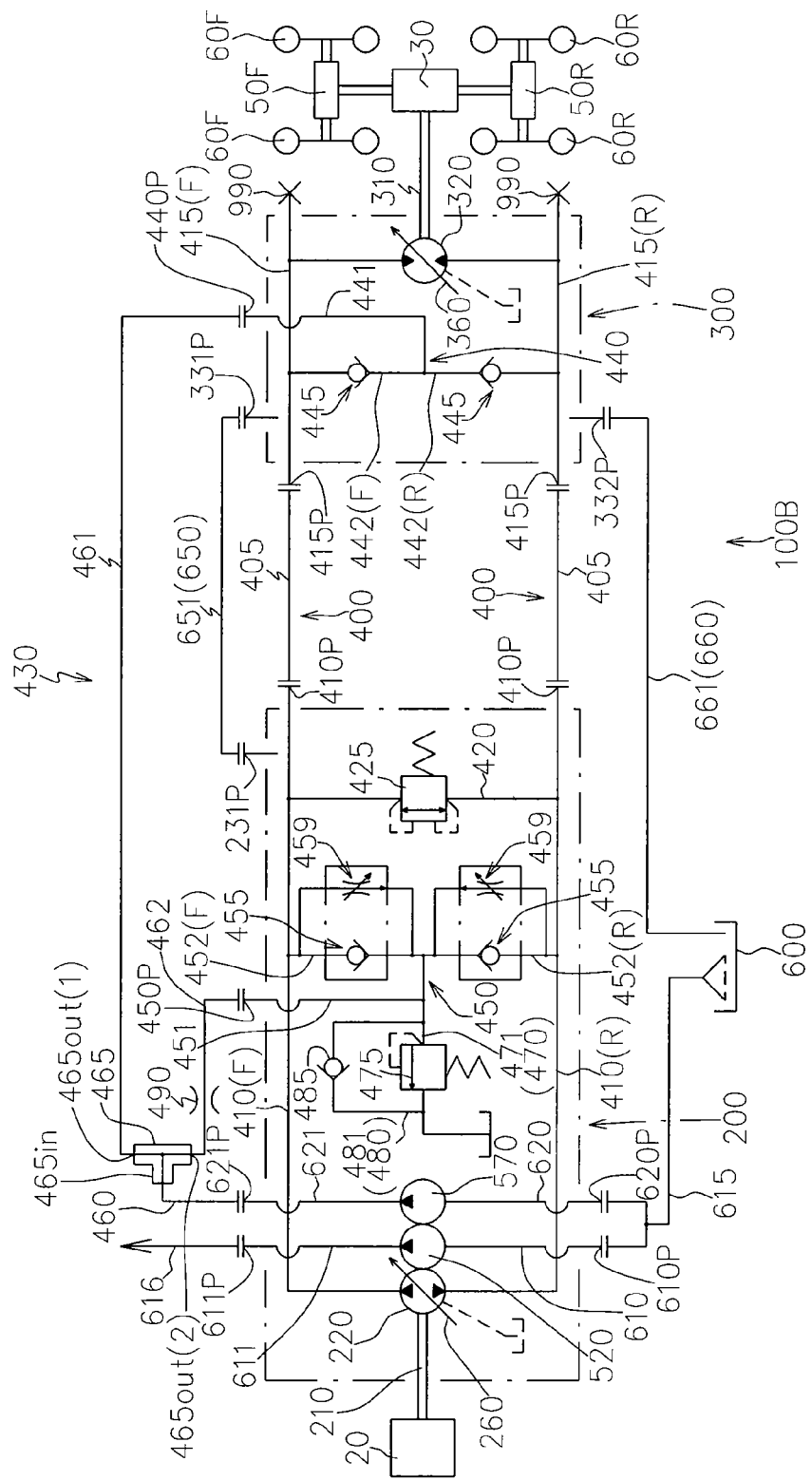
FIG. 12 is a hydraulic circuit diagram of an HST according to an embodiment 2 of the present invention.

FIG. 12 is a hydraulic circuit diagram of an HST 100B according to the present embodiment.

In FIG. 12, the same reference characters are denoted for the same members as in the embodiment 1, and the detailed explanations thereof are omitted.

The HST 100B according to the present embodiment is different from the HST 100 according to the embodiment 1 only in a specified configuration for having the flow path resistance of the motor-side charge line smaller than that of the pump-side charge line.

That is, the HST 100B according to the present embodiment is configured to have the flow path resistance of the motor-side charge line smaller than that of the pump-side charge line by arranging a throttle 490 in the pump-side charge line, as shown in FIG. 12.

The throttle 490 may be mounted at, for example, the second flow-out end 465out(2) of the three-sided joint 465, the pump-side charge conduit 462, or the pump-side charge port 450P.

It is obviously possible that the throttle 490 is arranged in the HST 100 according to the embodiment 1.

In the HST 100B, it is also possible to effectively prevent the suction amount of the motor main body 320 from becoming shorter than the discharge amount of the pump main body 220.

Accordingly, the free-wheel phenomenon could be prevented so that the engine brake effectively applied to the driving-wheels 60.

Embodiment 3

Still another embodiment of the HST according to the present invention will now be described with reference to the attached drawings.

Figure 13:
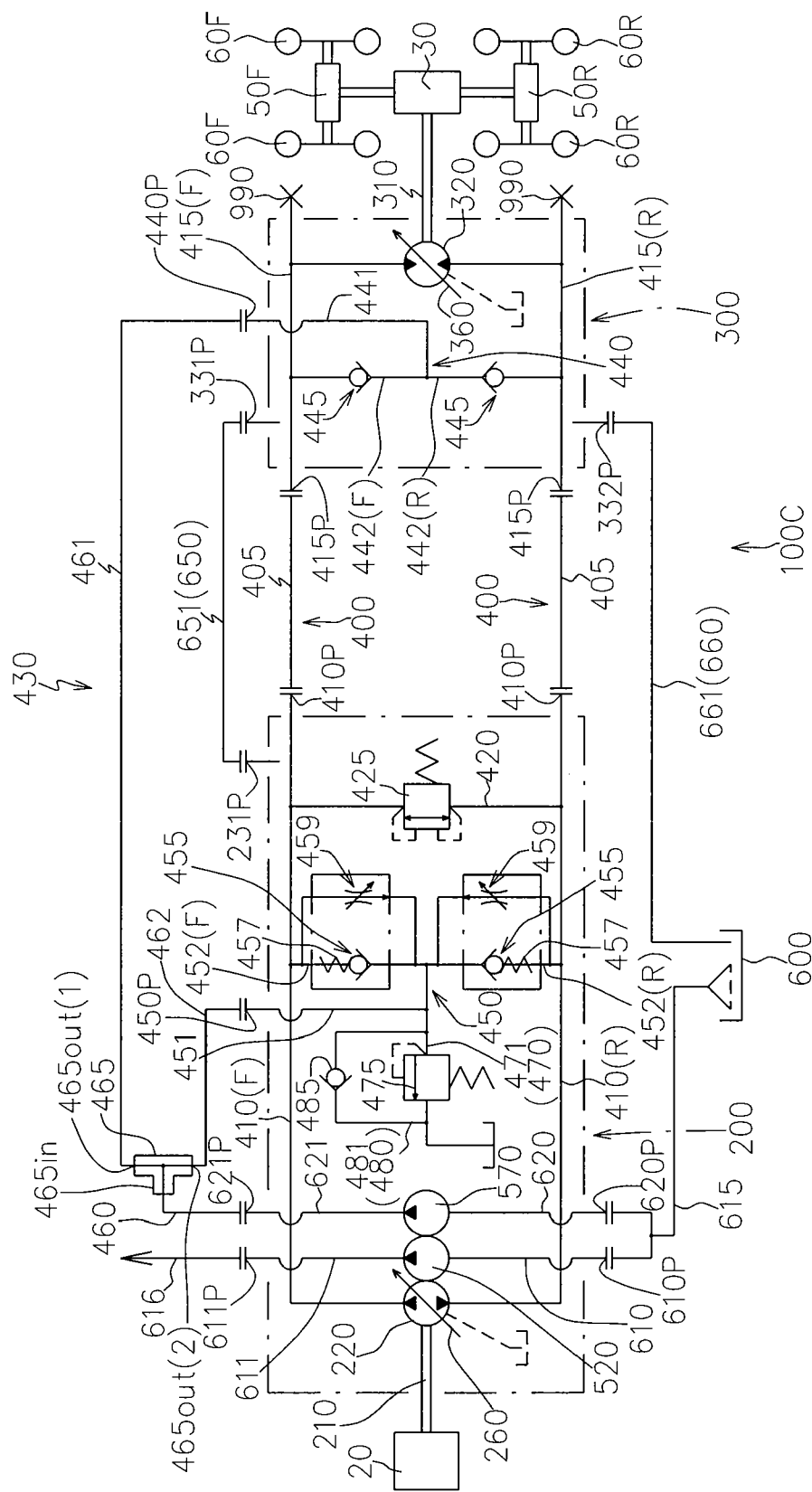
FIG. 13 is a hydraulic circuit diagram of an HST according to an embodiment 3 of the present invention.

FIG. 13 is a hydraulic circuit diagram of an HST 100C according to the present embodiment.

In FIG. 13, the same reference characters are denoted for the same members as in the embodiments 1 and 2, and the detailed explanations thereof are omitted.

The HST 100C according to the present embodiment is different from the HSTs 100, 100B according to the embodiments 1 and 2 only in a specified configuration for having the flow path resistance of the motor-side charge line smaller than that of the pump-side charge line.

That is, the HST 100C is configured so that a biasing member 447 of the motor-side check valve 445 has a biasing force less than a biasing member 457 of the pump-side check valve 455.

Specifically, the pump-side check valve includes a pump-side check valve main body 456 and the pump-side biasing member 457 for biasing the pump-side check valve main body 456 to a valve seat as shown in FIG. 6, so that the replenishing fluid flow into the pump-side operation fluid passages 410 while moving the pump-side check valve main body 456 against the biasing force of the pump-side biasing member 457.

Similarly, the motor-side check valve 445 includes a motor-side check valve main body 446 and the motor-side biasing member 447 for biasing the motor-side check valve main body 446 to a valve seat, as shown in FIG. 11.

The HST 100C according to the present embodiment is configured so that the flow path resistance of the motor-side charge line is less than that of the pump-side charge line by having the biasing force of the motor-side biasing member 447 less than that of the pump-side biasing member 457.

It is obviously possible that the configuration is applied to the HSTs 100, 100B according to the embodiments 1 and 2.

In the HST 100C, it is also possible to effectively prevent the suction amount of the motor main body 320 from becoming shorter than the discharge amount of the pump main body 220.

Accordingly, the free-wheel phenomenon could be prevented so that the engine brake effectively applies to the driving-wheels 60.

Embodiment 4

Still another embodiment of the HST according to the present invention will now be described with reference to the attached drawings.

Figure 14:
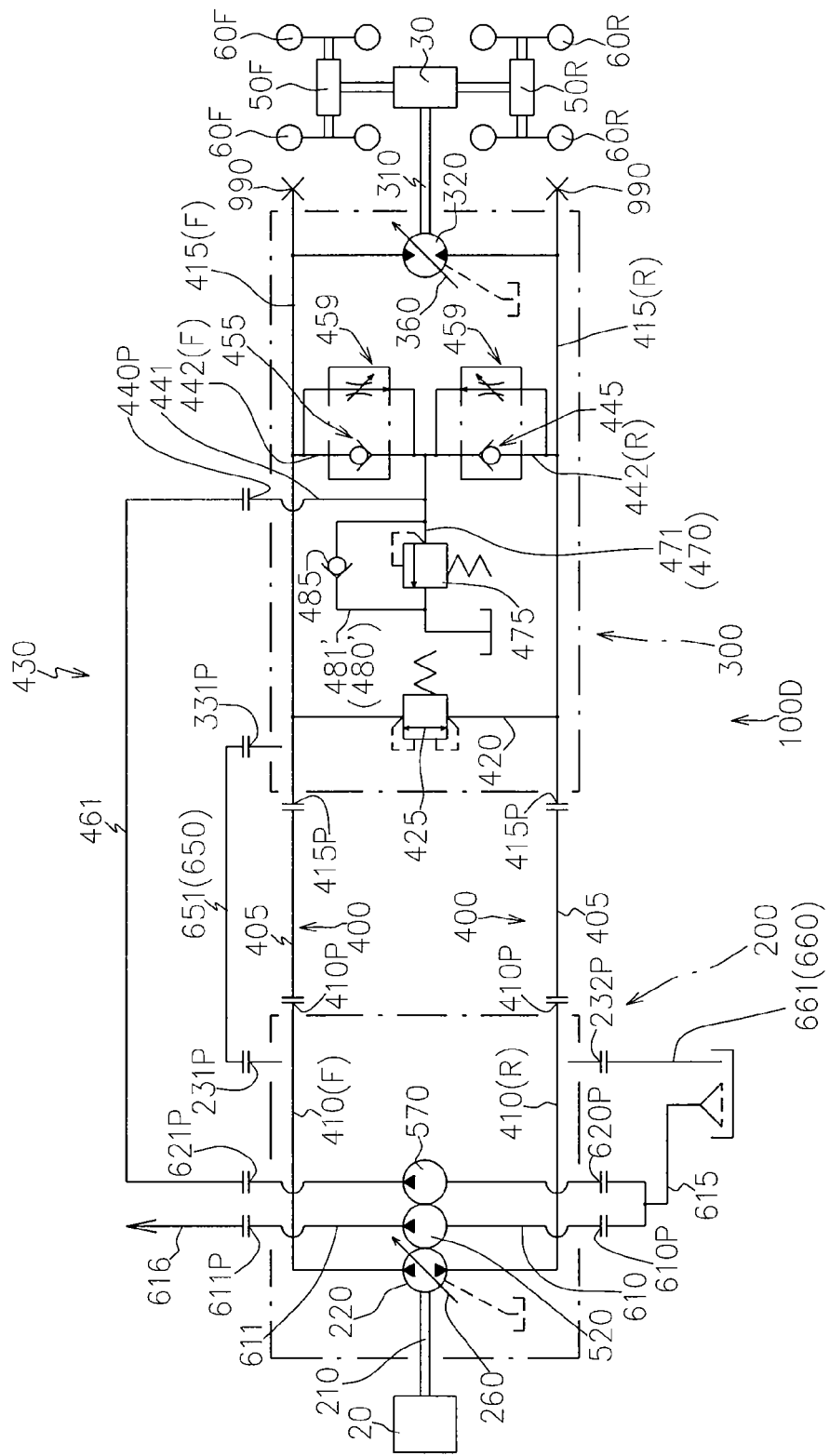
FIG. 14 is a hydraulic circuit diagram of an HST according to an embodiment 4 of the present invention.

FIG. 14 is a hydraulic circuit diagram of an HST 100D according to the present embodiment.

In FIG. 14, the same reference characters are denoted for the same members as in the embodiments 1 to 3, and the detailed explanations thereof are omitted.

The HST according to the present embodiment is configured so as to replenish the operation fluid only to the motor-side operation fluid passages 415.

Specifically, the HST 100D omits the pump-side charge passage 450 and the pump-side check valve 455 in the HST 100 according to the embodiment 1.

In the HST 100D, the second discharge port 621P is fluidly connected to the motor-side charge port 440P through the motor-side charge conduit 461.

In the HST 100D, it is also possible to effectively prevent the suction amount of the motor main body 320 from becoming shorter than the discharge amount of the pump main body 220.

Accordingly, the free-wheel phenomenon could be prevented so that the engine brake effectively applies to the driving-wheels 60.

In the present embodiment, the bypass passage 420, the bi-directional relief valve 425 and the charge pressure setting line 470 is mounted at the hydraulic motor unit 300 rather than the hydraulic pump unit 200.

Further, the pump-side self-section line 480 is omitted, and the motor-side self-section line 480' is provided.

That is, in the present embodiment, substantially only the pump-side operation fluid passages 410 are formed in the pump-side port block 250.

With the configuration, it is possible to reduce the cost of the pump-side port block 250.

In the HST according to the present embodiment, the charge pressure setting line 470 is provided in the hydraulic motor unit 300, as described above. Accordingly, in the present embodiment, the fluid amount that flows into the motor space 330S becomes greater than the fluid amount that flows into the pump space 230S.

In view of such point, in the present embodiment, the discharge line 660 is configured to fluidly connect the pump space 230S to the fluid tank 600 through a pump-side second port 232P (see FIG. 14).

According to such configuration, the fluid overflowed from the motor space 330S flows into the pump space 330S via the communicating line 650, and thereafter, returns to the fluid tank 600 via the discharge line 660. The stored fluid is thus effectively prevented from retaining in the pump space 230S and the motor space 330S.

This specification is by no means intended to restrict the present invention to the preferred embodiments or modified embodiments set forth therein. Various modifications to the HST may be made by those skilled in the art without departing from the spirit and scope of the present invention as defined in the appended claims.

What is claimed is:

1. An HST in which a hydraulic pump unit operatively driven by a driving power source and a hydraulic motor unit arranged spaced apart from the hydraulic pump unit and operatively driving a driving-wheel are fluidly connected by way of operation fluid lines so as to form a closed circuit; wherein the hydraulic motor unit is provided with motor-side operation fluid passages forming one part of the operation fluid lines; a motor-side charge fluid passage having a first end opened to an outside to form a motor-side charge port and a second end fluidly connected to at least one of the motor-side operation fluid passages; and a check valve interposed in the motor-side charge fluid passage so as to allow the fluid to flow from the motor-side charge port to the one motor-side operation fluid passage while preventing the reverse flow, the hydraulic pump unit is provided with pump-side operation fluid passages forming one part of the pair of operation fluid lines; a pump-side charge fluid passage having a first end opened to an outside to form a pump-side charge port and a second end fluidly connected to at least one of the pump-side operation fluid passages; and a check valve interposed in the pump-side charge fluid passage so as to allow the fluid to flow from the pump-side charge port to the one pump-side operation fluid passage while preventing the reverse flow, and the flow path resistance of a motor-side charge line for replenishing the operation fluid from a fluid source to the one motor-side operation fluid passage through the motor-side charge fluid port is set to be smaller than that of a pump-side charge line for replenishing the operation fluid from the fluid source to the one pump-side operation fluid passage through the pump-side charge fluid port.

2. An HST according to claim 1, wherein the motor-side charge passage is fluidly connected to a motor-side first operation fluid passage, out of the motor-side operation fluid passages, which has a negative pressure when the driving-wheel rotates in the forward direction.

3. An HST according to claim 2, wherein
the motor-side charge fluid passage includes a motor-side common charge fluid passage having a first end opened to an outside to form the motor-side charge port; a motor-side first charge fluid passage for fluidly connecting the motor-side common charge fluid passage to the motor-side first operation fluid passage; and a motor-side second charge fluid passage for fluidly connecting the motor-side common charge fluid passage to a motor-side second operation fluid passage, out of the pair of motor-side operation fluid passages, which has a negative pressure in a time when the driving-wheel rotates in the rearward direction, and
the check valve is inserted into each of the motor-side first and second operation fluid passages.

4. An HST according to claim 1, wherein
the check valve includes a check valve main body and a biasing member for biasing the check valve main body to a valve seat, and
the biasing member of the check valve provided in the hydraulic motor unit has a biasing force less than the biasing member of the check valve provided in the hydraulic pump unit.

5. An HST according to claim 1, wherein a conduit for fluidly connecting the fluid source and the motor-side charge fluid port has a length shorter than a conduit for fluidly connecting the fluid source and the pump-side charge fluid port.

6. An HST according to claim 1, wherein a throttle is inserted in the pump-side charge line.

7. An HST according to claim 1, wherein the fluid source is a charge pump main body mounted at the hydraulic pump unit.

8. An HST in which a hydraulic pump unit operatively driven by a driving power source and a hydraulic motor unit arranged spaced apart from the hydraulic pump unit and operatively driving a driving-wheel are fluidly connected by way of operation fluid lines so as to form a closed circuit; wherein
the hydraulic motor unit is provided with motor-side operation fluid passages forming one part of the operation fluid lines; a motor-side charge fluid passage having a first end opened to an outside to form a motor-side charge port and a second end fluidly connected to at least one of the motor-side operation fluid passages; and a check valve interposed in the motor-side charge fluid passage so as to allow the fluid to flow from the motor-side charge port to the one motor-side operation fluid passage while preventing the reverse flow,
the hydraulic motor unit includes a motor shaft operatively connected to the driving-wheel; a motor main body that is fluidly connected to a pump main body of the hydraulic pump unit through the operation fluid lines and drives the motor shaft around its axis line; and a motor case that is capable of storing fluid and accommodates the motor main body, the motor case being provided with the motor-side operation fluid passages and the motor-side charge fluid passage, and
the motor case is further provided with a self-suction passage having a first end opened into an inner space of the motor case and a second end fluidly connected to the motor-side charge fluid passage, and a check valve for allowing the fluid to flow from the first end to the second end of the self-suction fluid passage while preventing the reverse flow.

* * * * *